United States Patent
Ito et al.

(10) Patent No.: US 8,015,906 B2
(45) Date of Patent: Sep. 13, 2011

(54) ACTUATOR WITH ACTUATING PIN

(75) Inventors: Shun Ito, Aichi-ken (JP); Michihisa Asaoka, Aichi-ken (JP); Naohiko Ishiguro, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 204 days.

(21) Appl. No.: 12/457,217

(22) Filed: Jun. 4, 2009

(65) Prior Publication Data
US 2009/0301339 A1    Dec. 10, 2009

(30) Foreign Application Priority Data
Jun. 9, 2008    (JP) ................................. 2008-150939

(51) Int. Cl.
*B60R 21/16* (2006.01)
(52) U.S. Cl. ....... 89/1.14; 280/739; 280/743.2; 102/531
(58) Field of Classification Search ................. 089/1.14; 102/530, 531; 280/728.1–743.2, 801.1–808
See application file for complete search history.

(56) References Cited

U.S. PATENT DOCUMENTS

| | | | |
|---|---|---|---|
| 5,782,322 A * | 7/1998 | Hauck et al. | 188/72.4 |
| 6,513,835 B2 * | 2/2003 | Thomas | 280/743.2 |
| 7,111,871 B2 | 9/2006 | Thomas | |
| 7,275,763 B2 | 10/2007 | Thomas et al. | |
| 2007/0295232 A1 | 12/2007 | Hirooka et al. | |
| 2008/0238058 A1 * | 10/2008 | Numoto et al. | 280/737 |

FOREIGN PATENT DOCUMENTS

DE    102005012614    10/2005
JP    A-2007-333044    12/2007

OTHER PUBLICATIONS

Office Action dated Sep. 10, 2010 in corresponding German patent application No. 102009023961.8 (English translation enclosed).

* cited by examiner

*Primary Examiner* — Bret Hayes
*Assistant Examiner* — Joshua Freeman
(74) *Attorney, Agent, or Firm* — Posz Law Group, PLC

(57) ABSTRACT

An actuator includes a piston having an actuating pin, a squib, and a cylinder case. The cylinder case has a peripheral wall part that covers the circumference of the piston and a ceiling wall part having a through hole which allows an actuating pin to protrude from the through hole. The actuator is configured to make the a piston move backward along with the actuating pin by ejecting a driving gas generated from the squib to a space between the ceiling wall part and the piston during actuation. A sealing ring which is relatively movable with respect to the actuating pin while maintaining the state of sealing up a gap between the actuating pin and the through hole, is provided at an inner face side of the ceiling wall part.

16 Claims, 12 Drawing Sheets

ACTUATOR WITH ACTUATING PIN

BACKGROUND OF THE INVENTION

1. Field of the Invention

The present invention relates to an actuator which is movable so as to pull in an actuating pin along the axial direction during actuation, and to an actuator which is available for control for inner pressure in an airbag, the control for a shape of an airbag, and the like in an airbag apparatus which is mounted in, for example, a vehicle, that is required to instantly bring an actuating pin into action during actuation.

2. Related Art

Conventionally, there has been an actuator which is configured to let a piston held in a cylinder case so as to make an actuating pin protrude, move backward along with the actuating pin in the cylinder case with use of a driving gas generated when a squib provided in the piston is actuated. In this conventional actuator, the squib is configured to make the piston move backward along with the actuating pin by ejecting the driving gas to a space between the cylinder case and the piston during actuation (for example, refer to US 2002/0135166A and JP 2007-333044A).

However, in the actuators disclosed in US 2002/0135166A and JP 2007-333044A, although an actuating pin is made to protrude from a through hole provided in a ceiling wall part of a cylinder case, because a seal member to perform sealing so as to block up a gap formed between the actuating pin and the through hole when the actuating pin is inserted through the through hole is not provided, it is difficult to ensure sufficient airtightness of the cylinder case, which has left room for improvement in the point that a driving gas is prevented from leaking and the actuating pin is made to rapidly move backward during actuation.

SUMMARY OF THE INVENTION

The present invention has been achieved in order to solve the above-described problem, and an object of the present invention is to provide an actuator with an actuating pin that prevents gas leaks from around the actuating pin, and is capable of making the actuating pin rapidly move backward during actuation.

An actuator with an actuating pin according to the present invention includes a piston having an actuating pin, a squib which is ignited during actuation to be capable of generating a driving gas, and a cylinder case holding the piston, and in the actuator with the actuating pin, the piston is configured to make the actuating pin protrude from a leading end thereof, the cylinder case has a substantially tubular peripheral wall part that covers a circumference of the piston, and a ceiling wall part which has a through hole which allows the actuating pin to protrude therethrough, the ceiling wall part blocks up a leading end side of the peripheral wall part, during actuation of the actuator with the actuating pin, the driving gas generated from the squib is ejected to a space between the ceiling wall part and the piston in the cylinder case, to make the piston move backward along with the actuating pin, and a sealing ring which is relatively movable with respect to the actuating pin while maintaining a state of sealing up a gap between the actuating pin and the through hole, is provided at an inner face side of the ceiling wall part.

According to the actuator with the actuating pin of the present invention, because the sealing ring to seal up the gap between the actuating pin and the through hole provided in the ceiling wall part is provided at the inner face side of the ceiling wall part in the cylinder case from which the actuating pin is made to protrude, and the sealing ring is made relatively movable with respect to the actuating pin while maintaining the state of sealing up the gap between the actuating pin and the through hole, during actuation of the squib, it is possible to seal up the gap between the actuating pin and the through hole before a backward movement of the actuating pin by the sealing ring, and when the actuating pin moves backward along with the piston as well, it is possible to maintain the state of sealing up the gap between the actuating pin and the through hole by the sealing ring. Therefore, during actuation of the squib, it is possible to prevent the driving gas from leaking out of the gap between the actuating pin and the through hole as much as possible, and it is possible to allow the actuating pin to rapidly move backward.

Therefore, according to the actuator with the actuating pin of the present invention, it is possible to prevent gas leaks from around the actuating pin, and it is possible to allow the actuating pin to rapidly move backward during actuation.

Further, according to the actuator with the actuating pin of the present invention, because the gap between the actuating pin and the through hole is sealed up by the sealing ring from the time before actuation of the squib until the actuating pin moves backward after actuation of the squib, it is also possible to prevent a flame during actuation of the squib from being ejected from the gap between the actuating pin and the through hole to the outside. Moreover, according to the actuator with the actuating pin of the present invention, because the gap between the actuating pin and the through hole is always sealed up by the sealing ring when the actuator is mounted in a vehicle, the resistance to moisture or the like as well is satisfactory.

Moreover, in the actuator with the actuating pin of the present invention, provided that a presser plate which is formed to have stiffness higher than that of the sealing ring, and which is configured to be relatively movable with respect to the actuating pin, and is capable of regulating a backward movement of the sealing ring when the piston moves backward, is provided at a rear side of the sealing ring, because a backward movement of the sealing ring is regulated by the presser plate, and the sealing ring is tightly pressured toward the ceiling wall part uniformly by the presser plate formed to have stiffness higher than that of the sealing ring, it is possible to seal up the gap between the actuating pin and the through hole uniformly over the entire circumference around the actuating pin, which is preferable.

Note that, if the squib is configured to be capable of ejecting a driving gas to a space between the ceiling wall part and the piston in the cylinder case, the squib may be formed separately from the piston, to be held at the side of the cylinder case, or the squib may be provided integrally with the piston.

Then, when the squib is provided integrally with the piston, it is preferable that the piston is configured to cover a leading end side of the squib and make the actuating pin protrude therefrom, and to provide ejection holes from which the driving gas can be ejected, around the actuating pin, and the ejection holes are provided to be capable of pressing the presser plate disposed at the rear side of the sealing ring in a direction of forward movement by the driving gas ejected from the ejection holes.

According to the actuator with the actuating pin having the above-described configuration, during actuation, when the driving gas discharged from the squib is ejected from the ejection holes into the cylinder case, the driving gas presses the presser plate disposed at the rear side of the sealing ring in the direction of forward movement, i.e., toward the ceiling wall part, and the sealing ring receives the pressing force of the driving gas to be tightly pressured toward the ceiling wall part by the presser plate. That is, because the sealing ring is tightly pressured toward the ceiling wall part while blocking the gap between the actuating pin and the through hole via the presser plate by the driving gas, it is possible to prevent the driving gas from leaking out of the gap between the actuating pin and the through hole as much as possible.

Further, in the actuator with the actuating pin having the above-described configuration, provided that the ejection holes are disposed so as to face the presser plate at the rear of the presser plate, and are configured to be capable of ejecting the driving gas along the axial direction of the actuating pin, because the driving gas discharged from the squib is ejected to be along the axial direction of the actuating pin into the cylinder case from the ejection holes, it is possible to make the piston rapidly move backward during actuation, and further, because the driving gas ejected from the ejection holes presses the presser plate forward along the axial direction of the actuating pin, the sealing ring can be tightly pressured toward the ceiling wall part directly by the presser plate, which is preferable.

Moreover, in the actuator with the actuating pin having the above-described configuration, provided that a temporary joint member that allows a backward movement of the piston during actuation, and regulates a backward movement of the piston before actuation, is provided between the peripheral wall part and the piston in the cylinder case, it is possible to reliably regulate a backward movement of the piston until actuation of the squib, which is preferable.

Moreover, in the actuator with the actuating pin having the above-described configuration, provided that a forward movement of the piston before actuation is regulated by the presser plate supported by the ceiling wall part via the sealing ring, the state in which the actuating pin protrudes from the ceiling wall part of the cylinder case can be stabilized before mounting onto a mounting region, which makes the handleability thereof satisfactory, which is preferable.

Moreover, in the actuator with the actuating pin having the above-described configuration, it is preferable to configure such that a tubular member which is formed by performing bending work on a sheet metal material, that makes the piston slidable on an inner circumferential surface thereof, is provided in a state in which a movement thereof along the axial direction with respect to the cylinder case is restricted, between the peripheral wall part and the piston in the cylinder case, and the tubular member is formed as the temporary joint member on which locking protrusions which are formed to be cut to stand so as to protrude toward the inner circumferential surface, and are configured to lock a rim of a locking recessed portion provided on the piston in assembly with an outer circumference of the piston, to be capable of regulating a backward movement of the piston before actuation, and of unlocking the locking so as to allow a backward movement of the piston during actuation, are provided.

In the actuator with the actuating pin having the above-described configuration, because the tubular member serving as a temporary joint member can be formed by merely performing bending work on some part of a sheet metal material before bending work, that forms the tubular member, to form the locking protrusions, and by performing bending work on the entire material, it is possible to easily form the temporary joint member. Further, in the actuator with the actuating pin having the above-described configuration, provided that the locking protrusions are formed in advance on the sheet metal material forming the tubular member, the tubular member formed by bending work so as to be capable of being externally mounted to the circumference of the piston, is externally mounted to the piston, and thereafter, the piston to which the tubular member is externally mounted is housed in the cylinder case, the piston is housed in the cylinder case in a state in which the rim of the locking recessed portion is locked by the locking protrusions, which also makes it easy to manufacture the actuator. Note that, in a case in which the tubular member is formed of a formation material which is easy to perform bending work thereto, the tubular member may be formed such that a sheet metal material on which locking protrusions are formed in advance is made to bend to be tubular so as to be provided around the piston, and at the same time, the tubular member can also be externally mounted to the piston.

Moreover, in the actuator with the actuating pin having the above-described configuration, provided that the tubular member is composed of a top plate serving as the presser plate disposed at the side of the ceiling wall part of the cylinder case so as to cover one end side in the axial direction, and a peripheral wall having the locking protrusions, which is provided between the peripheral wall part and the piston in the cylinder case, a number of components can be reduced as compared with a case in which a presser plate and a tubular member are separately provided, which is preferable. Further, in the actuator with the actuating pin having the above-described configuration, because the tubular member has the top plate through which the actuating pin is inserted, when the tubular member in which the piston is housed is assembled with the cylinder case, the actuating pin is supported by the rim of the insertion hole provided in the top plate, to be hard to wobble with respect to the cylinder case, and the actuating pin can be made to easily protrude from the cylinder case in assembly with the cylinder case, which makes the assembly workability in assembly of the piston with the cylinder case satisfactory.

Moreover, in the actuator with the actuating pin having the above-described configuration, it is preferable to configure such that deforming parts which are deformable are provided so as to enable the top plate to relatively move forward with respect to the peripheral wall during actuation, near a rim of the top plate in the vicinities of the joining parts with the peripheral wall.

In the actuator with the actuating pin having the above-described configuration, even if there is a risk that the peripheral wall in which the locking protrusions are locked in the locking recessed portion moves backward in line with the piston due to great kinetic energy of the piston moving backward during actuation, the deforming parts provided near the rim of the top plate are deformed, to enable the top plate to relatively move forward with respect to the peripheral wall. In other words, because it is possible to prevent the top plate from moving backward so as to separate from the sealing ring in line with a backward movement of the peripheral wall, the sealing ring can be reliably tightly pressured toward the ceiling wall part by the top plate serving as a presser plate.

Furthermore, in the actuator with the actuating pin having the above-described configuration, it is preferable to configure such that the tubular member is formed of a plate spring material, the peripheral wall is composed of curved plate parts which are formed to divide an area at a side of an inner circumference of the peripheral wall part in the cylinder case into a plurality of pieces along the axial rotation direction, and are respectively jointed to the top plate, and the respective curved plate parts are formed such that an inner diameter size except for regions of the locking protrusions in an initial state before diameter expansion, is set to a size with which the curved plate parts can be tightly pressured onto an outer circumferential surface of the piston.

In the actuator with the actuating pin having the above-described configuration, at the time of manufacturing the actuator, when the respective curved plate parts in the tubular member which has been manufactured in advance are expanded in diameter, and the piston is housed inside thereof, the respective curved plate parts are respectively restored, to be provided so as to be tightly pressured onto the outer circumferential surface of the piston. Then, because the locking protrusions lock the rim of the locking recessed portion in a state in which the piston is housed inside thereof, it is possible to prevent the piston from moving backward with respect to the tubular member, and there is no need for an operator to hold the piston with his/her hands or the like when the tubular member in which the piston is housed is assembled with the cylinder case, which makes the assembly workability in assembly of the piston with the cylinder case satisfactory.

Furthermore, in the actuator with the actuating pin having the above-described configuration, it may be configured such that the tubular member is formed of a plate spring material, and is composed of a peripheral wall having the locking protrusions, which is a substantially cylinder shape whose both end sides in the axial direction are open, and the peripheral wall is formed so as to be divided axially over an entire area by one slit formed along the axial direction, and is configured such that an inner diameter size except for the regions of the locking protrusions in an initial state before diameter expansion, is set to a size with which the peripheral wall can be tightly pressured onto the outer circumferential surface of the piston.

In the actuator with the actuating pin having the above-described configuration as well, at the time of manufacturing the actuator, when the piston is housed inside thereof in a state in which the tubular member which has been manufactured in advance is expanded in diameter so as to expand the opening of the slit, the tubular member is restored, to be provided so as to be tightly pressured onto the outer circumferential surface of the piston. In the actuator with the actuating pin having the above-described configuration as well, because the locking protrusions lock the rim of the locking recessed portion in a state in which the piston is housed inside thereof, it is possible to prevent the piston from moving backward with respect to the tubular member, and there is no need for an operator to hold the piston with his/her hands or the like when the tubular member in which the piston is housed is assembled with the cylinder case, which makes the assembly workability in assembly of the piston with the cylinder case satisfactory.

Furthermore, in the actuator with the actuating pin having the above-described configuration, provided that at least some part of the piston and the peripheral wall part in the cylinder case are formed such that their cross-sectional shapes along the axial rotation direction are substantially noncircular, so as to make a rotation along the axial rotation direction of the piston with respect to the peripheral wall part impossible, because it is possible to prevent the piston from rotating with respect to the cylinder case, and to prevent the terminal of the squib provided in the piston from rotating when the actuator is mounted in a vehicle, it is therefore possible to prevent wrong assembly when the lead wire is connected to the terminal, which is preferable.

Note that, in the actuator with the actuating pin having the above-described configuration, the sealing ring may be composed of an O-ring, and a sealing ring which is a flat-plate discoid shape having a fitting hole into which the actuating pin can be inserted to fit may be used.

Further, in the actuator with the actuating pin having the above-described configuration, provided that a sealing ring capable of ensuring airtightness between the piston and the peripheral wall part in the cylinder case, is provided at a side of a base end distant from the actuating pin in the piston, during actuation of the squib, it is possible to prevent the driving gas from leaking out of the gap between the piston and the peripheral wall part, which is preferable.

DETAILED DESCRIPTION OF THE PREFERRED EMBODIMENTS

Figure 1:
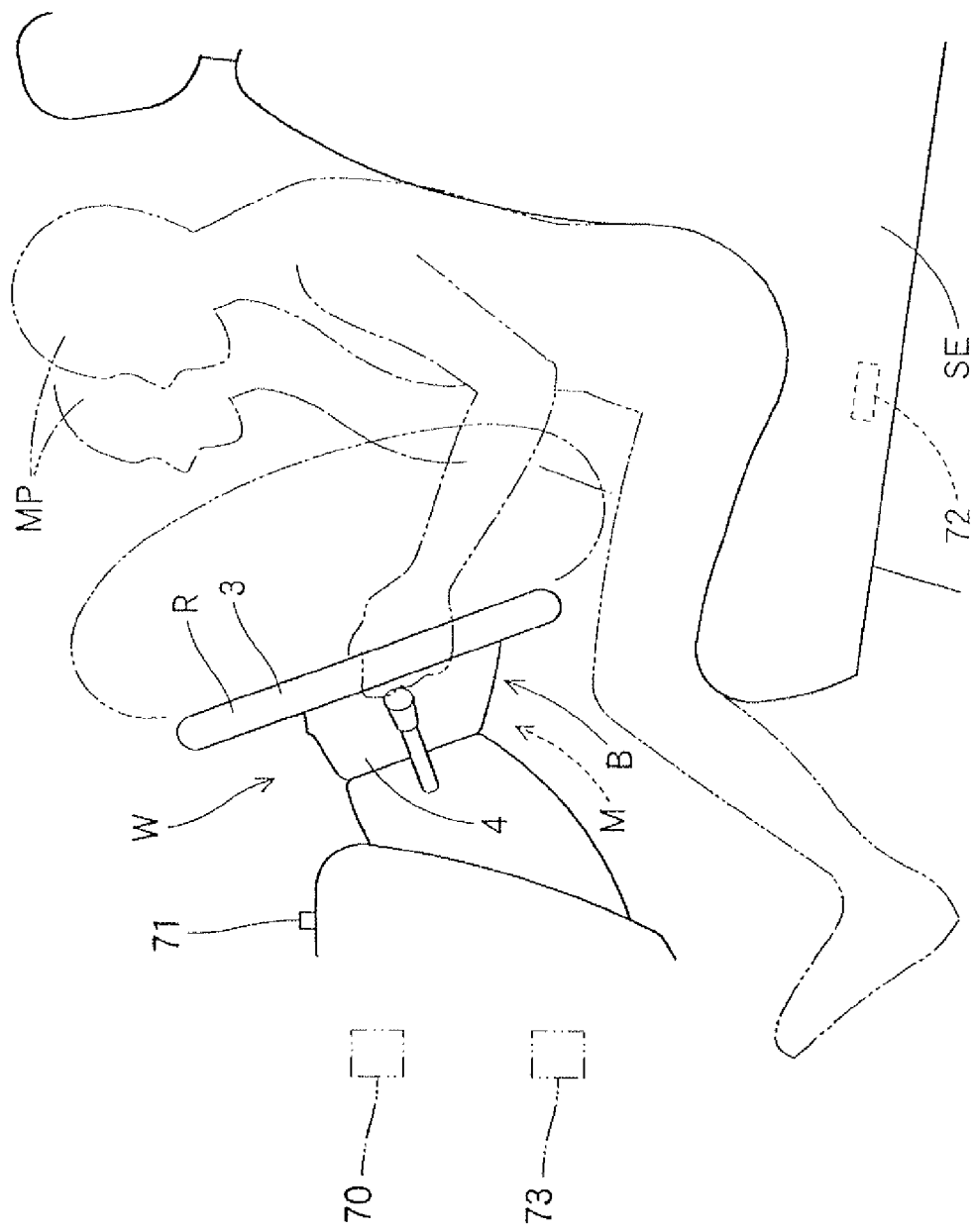
FIG. 1 is a diagram for explanation of an airbag apparatus for steering wheel for which an actuator that is an embodiment of the present invention is used.

Hereinafter, one embodiment of the present invention will be described with reference to the drawings. An actuator A1 (refer to FIGS. 4 and 5) in the embodiment is installed in an airbag apparatus M mounted in a steering wheel W as shown in FIG. 1. The actuator A1 is configured such that its actuation along with an inflator 8 of the airbag apparatus M is controlled by a control device 70 shown in FIG. 1.

Note that the vertical and horizontal directions in the embodiment are based on the time when the steering wheel W which is mounted in a vehicle is steered straight-ahead unless otherwise noted. In the embodiment, the vertical and horizontal directions are shown such that a direction which is the same as the axial direction of a steering shaft SS (refer to the chain double-dashed line in FIG. 2) with which the steering wheel W is assembled, is set to the vertical direction, and a direction horizontally perpendicular to the axial direction of the steering shaft SS is set to the horizontal direction. Further, the anteroposterior direction in the embodiment is set such that the side of a moving direction of a piston 47 in the actuator A1 provided such that its axial direction is along a direction anteroposteriorly perpendicular to the axial direction of the steering shaft SS, is a posterior direction.

The control device 70 is electrically connected to passenger detecting sensors which are capable of detecting a physical frame, a seating position, and the like of a driver (passenger) MP seated on a seat SE, for example, a position detecting sensor 71 which is capable of detecting a distance between the steering wheel W and the driver MP and a weight detecting sensor 72 which is capable of detecting a weight of the driver MP, and is further electrically connected to a collision detecting sensor 73 which is capable of detecting an acceleration, a direction of acceleration, etc., of a vehicle. Then, the control device 70 is configured to input an electrical signal from the position detecting sensor 71, the weight detecting sensor 72, or the collision detecting sensor 73 to bring the inflator 8 into actuation, and bring the actuator A1 into actuation. In the case of the embodiment, the actuator A1 is controlled by the control device 70, to actuate such that, when the airbag apparatus M is actuated to inflate the airbag 21, an inflating gas flowing in the airbag 21 is exhausted to the outside of the airbag 21 so as to be able to suppress inner pressure of the airbag 21, to inflate the airbag 21 in a preferable inflating mode.

Figure 2:
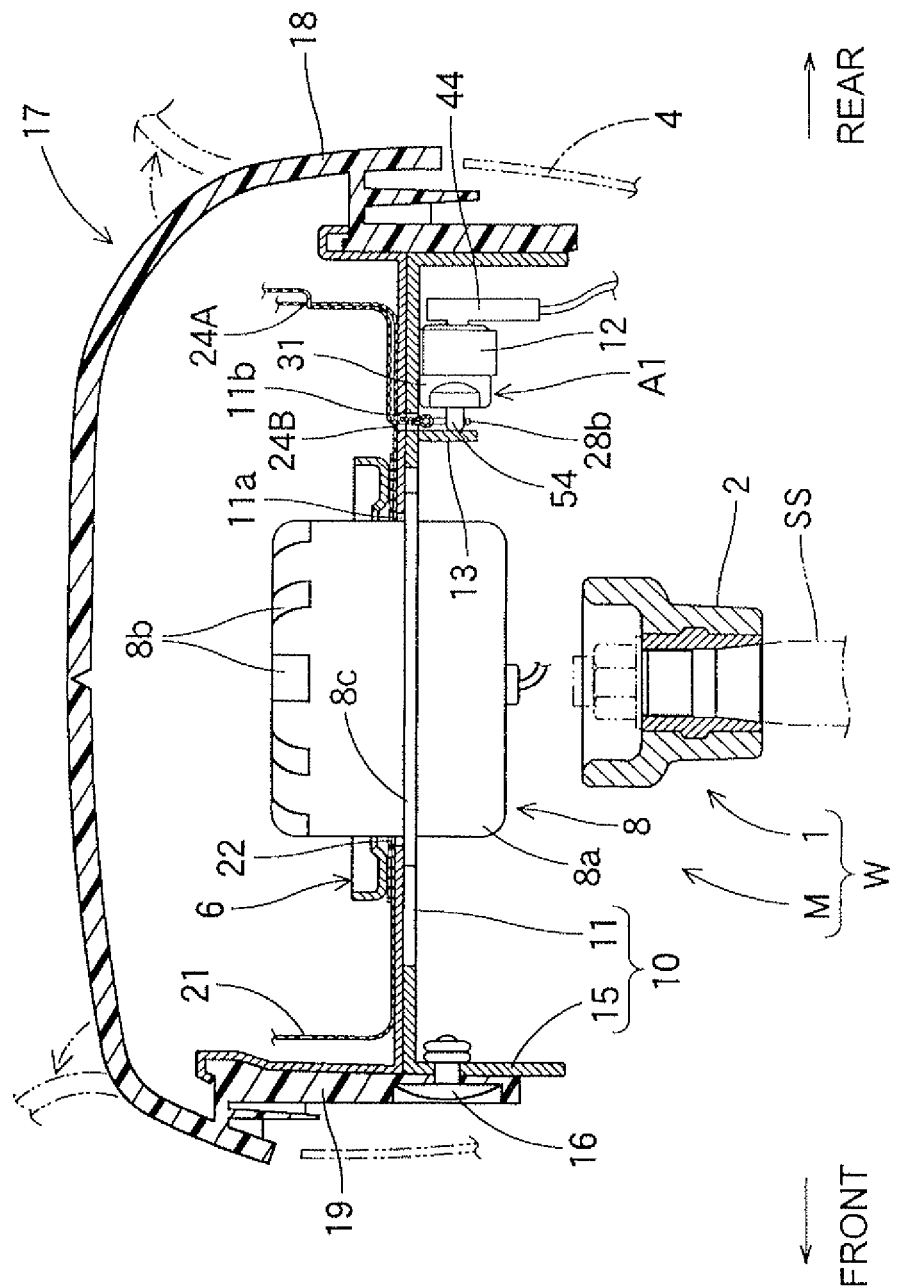
FIG. 2 is a longitudinal sectional view of the airbag apparatus for steering wheel for which the actuator of the embodiment is used.

Further, the airbag apparatus M is disposed in the upper portion in a boss part B of the steering wheel W as shown in FIGS. 1 and 2. The steering wheel W is composed of a ring part R to be gripped in steering, the boss part B which is disposed in the center to be interlinked to the steering shaft SS, and a predetermined number of spoke parts (not shown) that interlink the boss part B and the ring part R. Further, as the component parts above, the steering wheel W is composed of the airbag apparatus M and a steering wheel main body 1.

The steering wheel main body 1 is composed of a core bar 2 formed of aluminum alloy or the like, that is disposed so as to interlink the respective parts such as the ring part R and the boss part B, a covering layer 3 made of synthetic resin, that covers the ring part R and the core bar 2 serving as a region of a spoke part (not shown), and a lower cover 4 made of synthetic resin, that is disposed on the lower portion of the boss part B.

The airbag apparatus M is, as shown in FIG. 2, composed of the airbag 21 which is folded to be housed therein, the inflator 8 that supplies an inflating gas to the airbag 21, a bag holder 10 serving as a case that houses and holds the airbag 21 and the inflator 8, a pad 17 serving as an airbag cover that covers the upper side of the airbag 21 which is folded to be held by the bag holder 10.

The inflator 8 is composed of a substantially column-shaped main body part 8a having a plurality of gas discharge openings 8b discharging inflating gas upward, and a substantially rectangular plate-like flange part 8c disposed so as to protrude from the outer circumferential surface of the main body part 8a. Insertion holes (not shown) that allow bolts 6a (refer to FIG. 3) protruding from a retainer 6 which will be described later, to be inserted therethrough, are formed in the flange part 8c.

The retainer 6 is made of a substantially rectangular loop-shaped sheet metal, and is configured to have the bolts 6a protruding downward at its four corners. The respective bolts 6a of the retainer 6 pass through the rim of an inflow opening 22 at the inner circumferential surface side of the airbag 21 and the bag holder 10 to protrude from the flange part 8c of the inflator 8. Then, the respective bolts 6a are tightened with screw nuts 7 (refer to FIG. 3), to attach the airbag 21 and the inflator 8 to the bag holder 10 with use of the retainer 6.

The bag holder 10 is composed of a substantially rectangular plate-like bottom wall part 11 and a sidewall part 15 vertically extending from the rim of the bottom wall part 11. An insertion hole 11a which is circularly open so as to enable the main body part 8a of the inflator 8 to be inserted therethrough from the lower side to the upper side, is formed near the center of the bottom wall part 11. Four insertion holes (not shown) which enable the respective bolts 6a of the retainer 6 to be inserted therethrough, are formed at the rim of the insertion hole 11a. Further, an insertion hole 11b to enable a loop part 28b locked with an actuating pin 54, which will be described later, of the actuator A1 to be inserted therethrough is formed at the rear side of insertion hole 11a in the bottom wall part 11.

Figure 3:
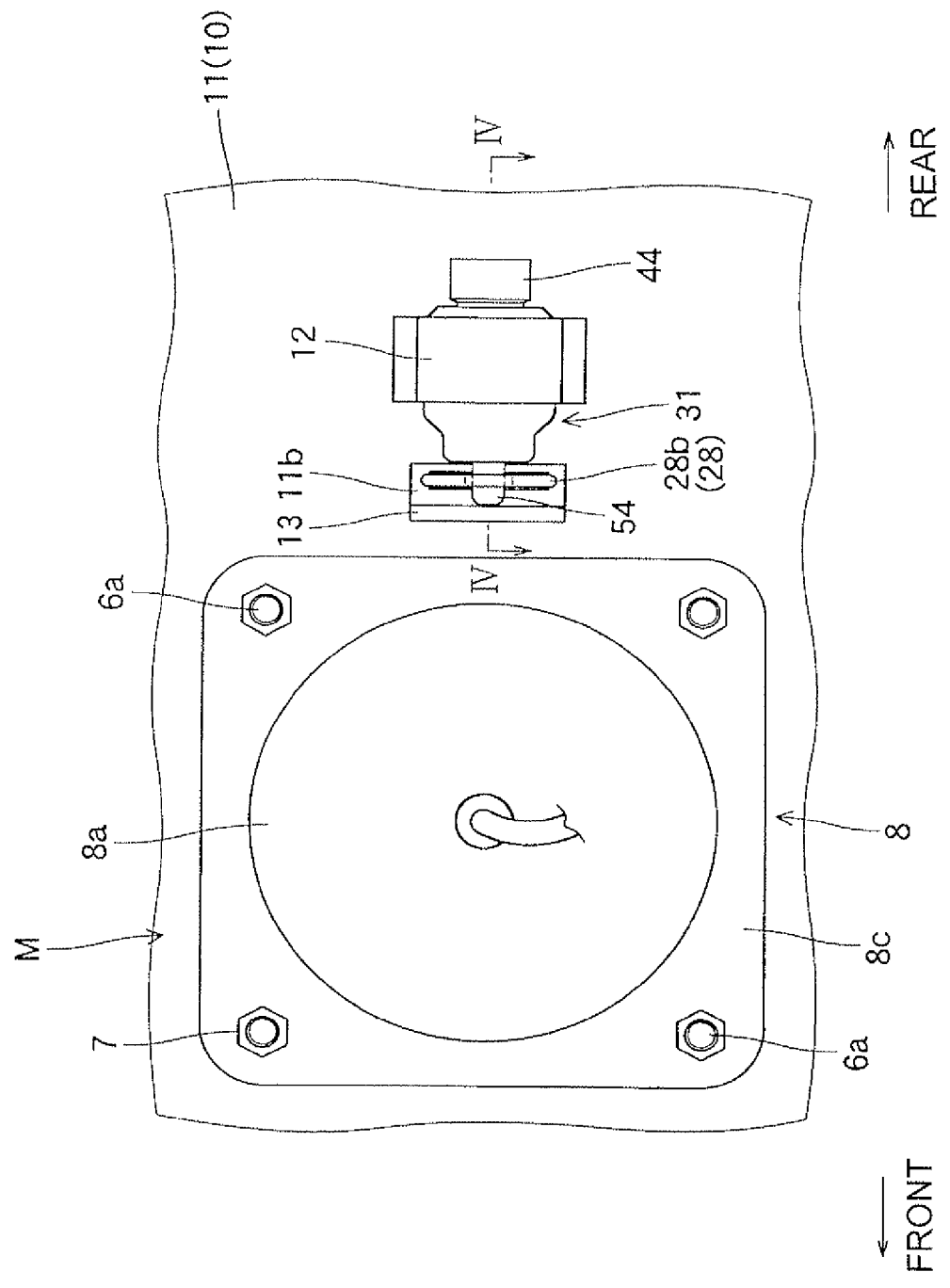
FIG. 3 is a partial bottom plan view of the airbag apparatus for steering wheel for which the actuator of the embodiment is used.
Figure 4:
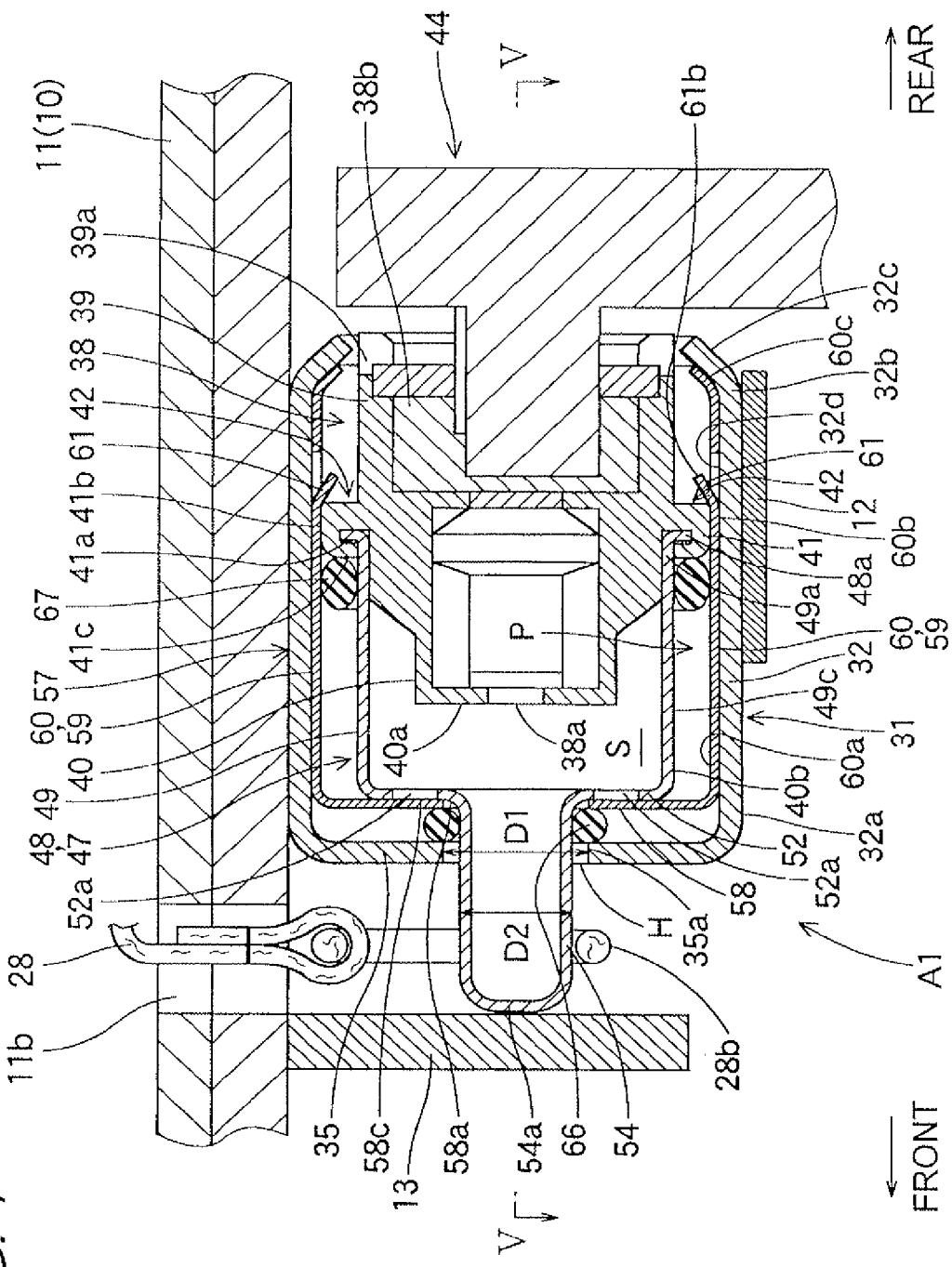
FIG. 4 is a longitudinal sectional view of the actuator of the embodiment, that corresponds to a region taken along the line IV-IV in FIG. 3.

Further, a mounting bracket 12 to hold the actuator A1 and a supporting piece part 13 provided at the side of a leading end face 54a of the actuating pin 54 of the actuator A1, are provided at the bottom face side of the bottom wall part 11 as shown in FIGS. 3 and 4. The supporting piece part 13 is to support the side of the leading end face 54a of the actuating pin 54 when locking the loop part 28b, to prevent the loop part 28b from dropping out of the actuating pin 54.

A sidewall part 19 of the pad 17 is fastened to the sidewall part 15 of the bag holder 10 with rivets 16, and a bracket (not shown) fixedly mounted to the side of the core bar 2 of the steering wheel main body 1 is formed on the sidewall part 15 of the bag holder 10.

The pad 17 is formed of synthetic resin such as olefin type thermoplastic elastomer resin, and is composed of a ceiling wall part 18 that covers the upper side of the boss part B and the substantially rectangular-tubular sidewall part 19 extending downward from the outer rim of the ceiling wall part 18 as shown in FIG. 2. A door part (whose reference numeral is omitted in the drawing) which is pressed to open when inflating the airbag 21 is provided to an inner region of the sidewall part 19 of the ceiling wall part 18. The sidewall part 19 is, as described above, fastened to the sidewall part 15 of the bag holder 10 with use of the rivets 16.

Figure 9A:
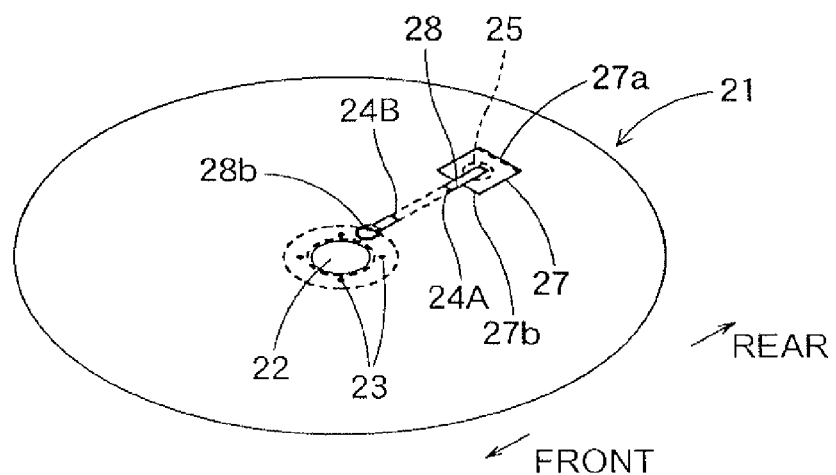
FIGS. 9A to 9C are diagrams showing a circumference of an exhaust hole of an airbag controlled to actuate by the actuator of the embodiment.
Figure 9B:
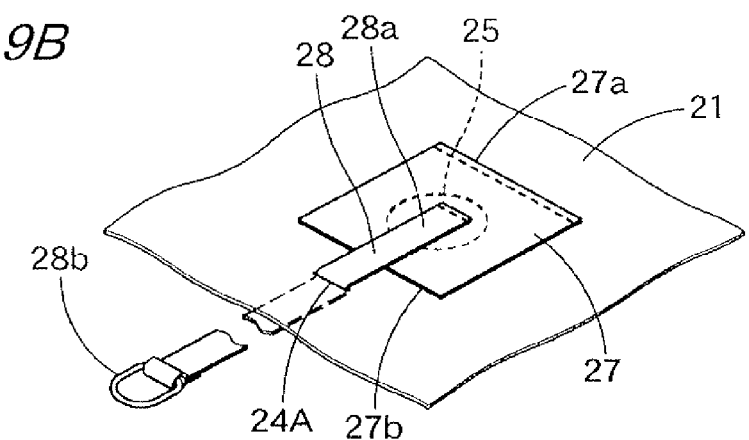
Figure 9C:
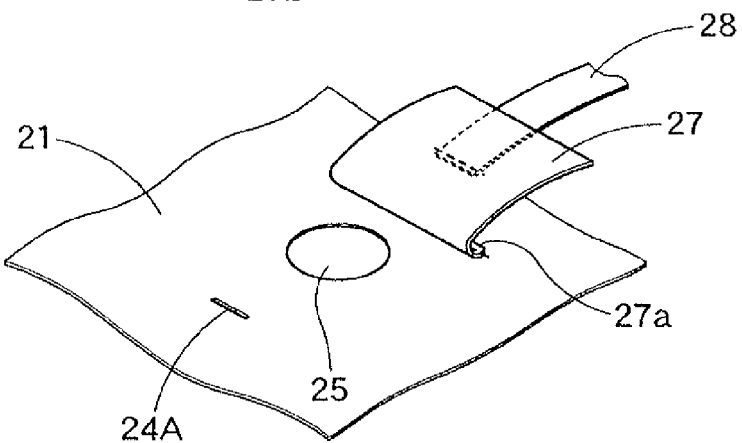

The airbag 21 is formed into a bag shape composed of a woven material having flexibility, which is formed of polyamide yarn, polyester yarn, or the like, and is configured to allow an inflating gas to flow therein so as to be capable of covering the top face side of the steering wheel W-as shown by the chain double-dashed line in FIG. 1. The airbag 21 has the inflow opening 22 which allows an inflating gas to flow in its inside as shown in FIGS. 9A to 9C. The inflow opening 22 serves as a region through which the main body part 8a of the inflator 8 is inserted from the lower side, to make an inflating gas discharged from the gas discharge opening 8b of the inflator 8 flow into the airbag 21. Four mounting holes 23 through which the bolts 6a formed on the retainer 6 are inserted, are formed in the rim of the inflow opening 22 (refer to FIG. 9A). Further, as shown in FIG. 9A, an exhaust hole 25 which is circularly open so as to allow an inflating gas flowing into the airbag 21 to flow out thereof is formed in a region which is the rear of the inflow opening 22. Slit-like insertion holes 24A and 24B which are formed substantially along the horizontal direction so as to allow a belt 28 which will be described later to be inserted therethrough, are formed in two places near the anterior border of the exhaust hole 25 and near the posterior border of the inflow opening 22, between the exhaust hole 25 and the inflow opening 22 (refer to FIGS. 2 and 9A to 9C).

A flap 27 is provided so as to block the exhaust hole 25 at the side of the outer circumferential surface of the airbag 21 (refer to FIGS. 9A to 9C). In the case of the embodiment, the flap 27 is attached to a marginal part (posterior border side) at the side separate from the inflow opening 22 of the exhaust hole 25. In detail, the flap 27 is composed of a woven material having flexibility formed of polyamide yarn, polyester yarn, or the like in the same way as the airbag 21. The flap 27 is formed into a substantially rectangle shape, and one side (the rear side in this embodiment) disposed separate from the inflow opening 22 is attached to the airbag 21, and is configured to be capable of opening as a hinge part 27a that is the region attached to the airbag 21, from the side of a leading end 27b facing the hinge part 27a (the one side at the side of the inflow opening 22) when being pressed by the inflating gas going to flow out of the exhaust hole 25.

A leading end 28a of the belt 28 is coupled to the flap 27. The belt 28 is formed of a cloth material made of polyester yarn or the like having flexibility, and is provided so as to be elongated in a direction from the hinge part 27a of the flap 27 toward the leading end 27b which is arranged to face the hinge part 27a, that is the leading end side of the opening. That is, in the case of the embodiment, the belt 28 is provided such that its longitudinal direction is along the anteroposterior direction. The substantially annular-shaped loop part 28b is provided at an end (the base side end), which is the side of the inflow opening 22 of the belt 28. The actuating pin 54 is inserted in the loop part 28b in a state in which the actuator A1 is not in actuation as shown in FIGS. 2 to 4. In the case of the embodiment, the loop part 28b is formed of a material having flexibility, and is configured to be capable of being inserted through the slit 24B provided in the airbag 21 when the airbag 21 is inflated in a state in which the actuating pin 54 is out of the loop part 28b. Then, when the airbag 21 is inflated in a state in which the actuating pin 54 is locked by the loop part 28b, the side of the leading end 27b of the flap 27 is pressed by the belt 28 to be inserted through the insertion hole 24A, and the airbag 21 is inflated in a state in which the flap 27 blocks the exhaust hole 25 as shown in FIG. 9A. On the other hand, when the airbag 21 is inflated in a state in which the actuator A1 is actuated to cause the actuating pin 54 to be out of the loop part 28b, because the flap 27 is pressed by the inflating gas going to flow out of the exhaust hole 25, to cause the belt 28 to be pulled out of the insertion holes 24A and 24B to move, and at the same time, the flap 27 is opened to open the exhaust hole 25 as shown in FIG. 9B, the inflating gas flows out of the exhaust hole 25 to the outside of the airbag 21, which makes it possible to suppress a rise in inner pressure of the airbag 21.

Note that, with respect to the actuation of the actuator A1 such that the locking of the loop part 28b of the belt 28 is unlocked by, when the control device 70 detects that the driver MP comes too close to the steering wheel W by a signal from the position detecting sensor 71, or when the control device 70 detects that the driver MP has a small build by a signal from the weight detecting sensor 72, the control device 70 causes the actuator A1 to actuate so as to reduce the inner pressure in the inflated airbag 21 at the same time of or slightly behind the actuation of the airbag apparatus M.

Figure 5:
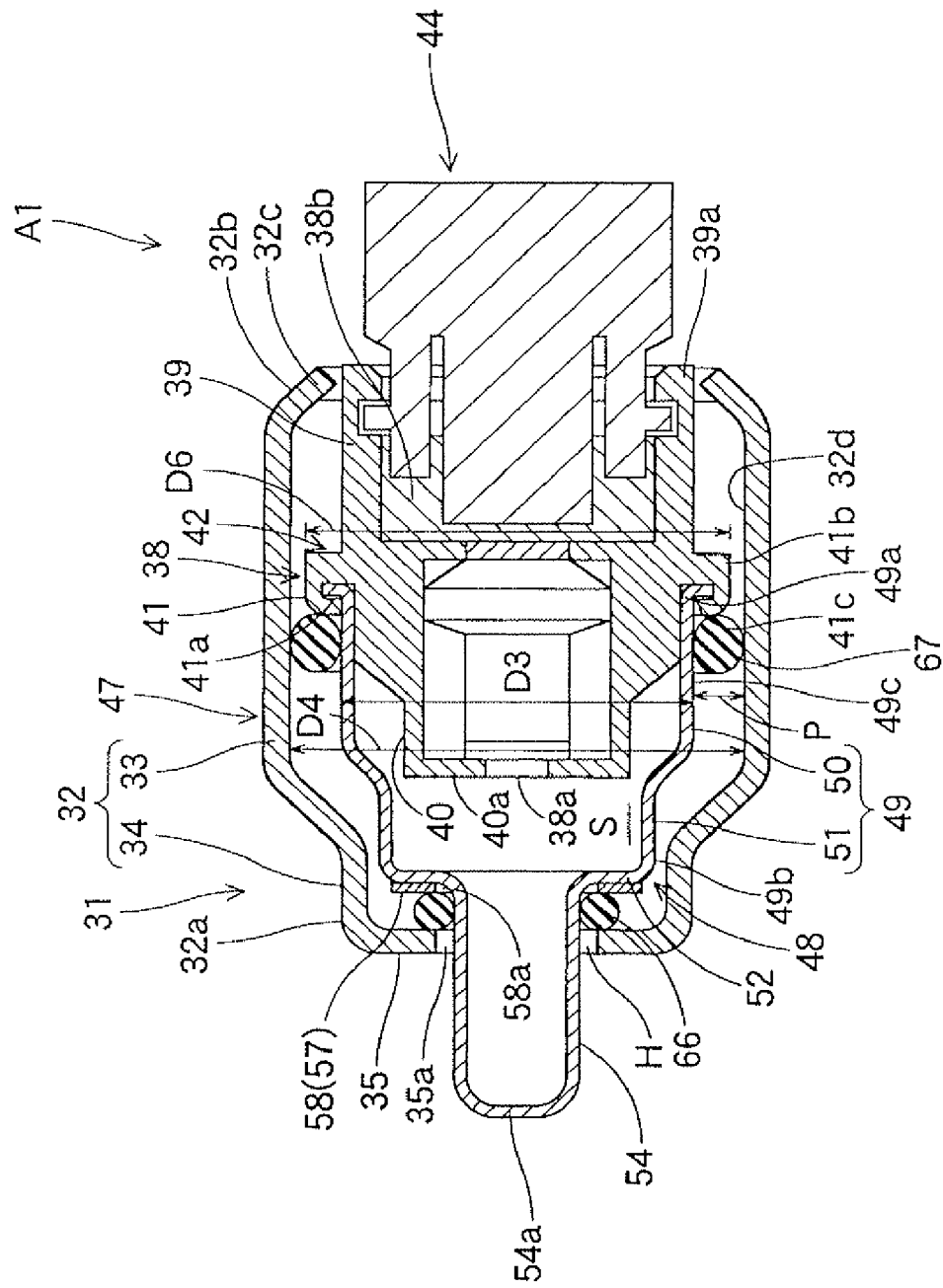
FIG. 5 is a longitudinal sectional view of the actuator of the embodiment, that corresponds to a region taken along the line V-V in FIG. 4.

As described in FIGS. 4 and 5, the actuator A1 is composed of a piston 47 having the actuating pin 54, a squib 38 which is ignited during actuation to be capable of generating a driving gas G, a cylinder case 31 holding the piston 47, a tubular member 57 which is disposed between the piston 47 and the cylinder case 31 to serve as a temporary joint member, a sealing ring 66 which is disposed on the inner face side of a ceiling wall part 35 which will be described later in the cylinder case 31, and a sealing ring 67 which is disposed between the rear end side of the piston 47 and a peripheral wall part 32 which will be described later in the cylinder case 31. In the actuator A1 in the embodiment, the squib 38 is provided integrally with the piston 47. Then, the actuator A1 in the embodiment is configured to cause the actuating pin 54 protruding from the ceiling wall part 35 in the cylinder case 31 to move backward so as to draw back into the cylinder case 31 during actuation of the squib 38 (refer to FIG. 10B).

The cylinder case 31 is, in the case of the embodiment, made of a sheet metal, and has the substantially cylindrical peripheral wall part 32 that covers the circumference of the piston 47 and the ceiling wall part 35 that blocks up the side of a leading end 32a of the peripheral wall part 32 (front end side in the case of the embodiment). The peripheral wall part 32 is provided such that its axial direction is along the anteroposterior direction, and is fixedly mounted to a position at the rear of the insertion hole 11a in the bottom wall part 11 of the bag holder 10 with use of the mounting bracket 12 provided so as to cover the circumference at the side of the base end 32b (rear end side). Further, the side of the base end 32b (rear end side) of the peripheral wall part 32 is configured to open so as to enable to expose the side of a terminal 38b, which will be described later, of the squib 38 provided in the piston 47. In more detail, the side of the base end 32b of the peripheral wall part 32 is configured to allow a main body part 39, which will be described later, of the squib 38 to be inserted through the peripheral wall part 32 when the piston 47 moves backward. A stopper 32c to prevent the piston 47 from dropping out of the cylinder case 31 when moving the piston 47 is formed into a substantially taper shape in cross section so as to reduce the diameter of the side of the base end 32b (rear end side), at the base side of the peripheral wall part 32. The stopper 32c makes a flange part 41, which will be described later, of the squib 38 provided integrally with the piston 47 contact when the piston 47 moves backward so as to draw the actuating pin 54 back thereinto, to prevent the piston 47 from dropping out of the cylinder case 31. In the case of the embodiment, the stopper 32c is formed such that the base end 32b of the peripheral wall part 32 is crimped after the piston 47 and the tubular member 57 are housed into the cylinder case 31 at the time of manufacturing the actuator A1.

Further, in the case of the embodiment, a part of the peripheral wall part 32 is formed such that its cross-sectional shape along the axial rotation direction is a substantially non-cylinder shape so as to make a rotation along the axial rotation direction of the piston 47 with respect to the peripheral wall part 32 impossible. In detail, the peripheral wall part 32 is formed such that the side of the base end 32b (rear end side) is a substantially cylinder shape and the side of the leading end 32a (front end side) is a substantially expanding cylinder shape formed to be recessed in the right and left both sides. That is, the peripheral wall part 32 is formed such that a cylinder-shaped base side tube part 33 and a substantially expanding cylinder-shaped leading end side tube part 34 formed such that its long-axial direction is along the vertical direction, are serially connected to one another so as to align their central axes. Then, the ceiling wall part 35 is formed into a substantially expanding cylinder shape whose long-axial direction is along the vertical direction so as to correspond to the leading end side tube part 34. A through hole 35a which allows the actuating pin 54 to protrude from the through hole 35a, is provided to be circularly open in the center of the ceiling wall part 35. The through hole 35a is formed such that its inner diameter size D1 is made slightly greater than an outer diameter size D2 of the actuating pin 54 so as to allow the actuating pin 54 to be inserted through the through hole 35a (refer to FIG. 4).

The squib 38 is composed of an initiator and a holder holding the initiator, and its outer shape is substantially columnar. In detail, the squib 38 is configured such that a head part 40 which is smaller in diameter than the main body part 39 is disposed at the leading end side (front end side) of the columnar main body part 39, and the flange part 41 which is formed to protrude on the entire area along the axial rotation direction of the main body part 39 and is greater in diameter than the main body part 39, is provided between the head part 40 and the main body part 39. Then, the squib 38 is configured such that a gas discharge opening 38*a* is disposed in the leading end face (a front end face 40*a*) of the head part 40, and the terminal 38*b* is disposed at the base end side (the side of a rear end 39*a*) of the main body part 39. The squib 38 is provided integrally with the piston 47 in the case of the embodiment, and the squib 38 is held on the piston main body 48 such that the side of the gas discharge opening 38*a* is covered with a piston main body 48, which will be described later, of the piston 47, and the terminal 38*b* is exposed from the piston main body 48. In more detail, the squib 38 is integrated with the piston main body 48 such that the rear end side of the piston main body 48 (the side of a base end 49*a* of the tubular part 49 which will be described later) is coupled to the region of the flange part 41, to cover the entire head part 40 with the piston main body 48, and to expose the main body part 39 from the piston main body 48. Further, in the case of the embodiment, the rear side of a stage formed on the boundary region between the flange part 41 of the squib 38 and the main body part 39 serves as a locking recessed portion 42 whose rim is locked by locking protrusions 61 formed in the tubular member 57. The squib 38 is electrically connected to the control device 70 by connecting a connector 44 disposed at the leading end side of a lead wire (not shown) extending from the control device 70 to the terminal 38*b*. When the actuator A1 is in actuation, an actuation signal from the control device 70 is input to ignite the squib 38, to burn an explosive (not shown) stored inside thereof, and the squib 38 discharges the driving gas G from the gas discharge opening 38*a*.

The piston 47 is composed of the actuating pin 54 and the piston main body 48 with which the squib 38 is integrated.

The piston main body 48 is made of a sheet metal, and is configured to cover the side of the gas discharge opening 38*a* (the front end side in the case of the embodiment) of the squib 38. In the case of the embodiment, the piston main body 48 is a substantially cylinder shape, which is formed to extend from the rim of the gas discharge opening 38*a* of the squib 38 (the region of the flange part 41 serving as the circumference of the head part 40) and for its axial direction to be along the axial direction (anteroposterior direction) of the cylinder case 31, so as to be capable of covering the head part 40 of the squib 38. In the case of the embodiment, the piston main body 48 is integrated with the squib 38 such that the base side (the side of the rear end 48*a*) is fit into a fitting recessed portion 41*a* formed on the front face side of the flange part 41 in the squib 38. In detail, in the case of the embodiment, the piston main body 48 is composed of the substantially cylinder-shaped tubular part 49 capable of covering the side in the axial rotation direction of the head part 40 of the squib 38, and a leading end wall part 52 formed so as to block up the leading end side of the tubular part 49.

A part of the tubular part 49 of the piston main body 48 is formed such that its cross-sectional shape along the axial rotation direction is a substantially non-cylinder shape so as to be capable of preventing the piston 47 from rotating along the axial rotation direction with respect to the peripheral wall part 32 of the cylinder case 31. In detail, the tubular part 49 is formed such that the side of the base end 49*a* (rear end side) is a substantially cylinder shape, and the side of the leading end 49*b* (front end side) is a substantially expanding cylinder shape formed to be recessed at the right and left both sides, so as to correspond to the peripheral wall part 32 of the cylinder case 31. That is, the tubular part 49 is, in the same way as the peripheral wall part 32 of the cylinder case 31, formed such that a cylinder-shaped base side tube part 50 and a substantially expanding cylinder-shaped leading end side tube part 51 formed such that its long-axial direction is along the vertical direction are serially connected to one another so as to align their central axes. The leading end wall part 52 is substantially oval whose long-axial direction is along the vertical direction so as to correspond to the leading end side tube part 51. Further, in the case of the embodiment, the base side tube part 50 of the tubular part 49 of the piston main body 48 is formed such that an outer diameter size D3 is made smaller than an inner diameter size D4 of the base side tube part 33 so as to provide a gap P between the base side tube part 50 and the base side tube part 33 in the peripheral wall part 32 of the cylinder case 31 (refer to FIG. 5). In other words, the tubular part 49 of the piston main body 48 is configured to provide the gap P over the entire area along the axial rotation direction, between the tubular part 49 and the peripheral wall part 32 of the cylinder case 31 at its base side (refer to FIGS. 4 and 5).

The actuating pin 54 is formed so as to protrude forward along the axial direction (anteroposterior direction) of the cylinder case 31 from the center of the leading end wall part 52. That is, the actuating pin 54 is serially configured so as to align its central axis to the piston main body 48. In the case of the embodiment, the piston main body 48 and the actuating pin 54 are integrally formed by performing press-working on a sheet metal material, and the actuating pin 54 is formed to be hollow so as to be continued from the leading end wall part 52 up to nearly the leading end face 54*a*. Further, the actuating pin 54 is, as described above, formed such that the outer diameter size D2 is made slightly smaller than the inner diameter size D1 of the through hole 35*a* so as to be capable of being smoothly inserted through the inside of the through hole 35*a* provided in the ceiling wall part 35 of the cylinder case 31.

Ejection holes 52*a* from which the driving gas G discharged from the squib 38 is ejected, are formed in regions of the leading end wall part 52 serving as the circumference of the actuating pin 54 in the piston main body 48. In the case of the embodiment, the ejection holes 52*a* are formed in two places above and under the actuating pin 54 which are symmetrical with respect to a point of the central axis of the actuating pin 54, and let the driving gas G generated from the squib 38 fill the inside of a space S surrounded by the piston main body 48 and the squib 38, be ejected into the cylinder case 31 along the axial direction (anteroposterior direction) of the actuating pin 54. In more detail, the ejection holes 52*a* are provided so as to be capable of pressing a top plate 58 (a presser plate), which will be described later, of the tubular member 57 disposed at the rear side of the sealing ring 66 in the direction of forward movement by the driving gas G, and are disposed so as to face the top plate 58 at the rear of the top plate 58.

The tubular member 57 serves as a temporary joint member that allows a backward movement of the piston 47 during actuation, and regulates a backward movement of the piston 47 before actuation. In the case of the embodiment, the tubular member 57 is formed so as to perform bending work on a plate spring material such as an SPCC. That is, the tubular member 57 is disposed inside the cylinder case 31 so as to be relatively movable with respect to the piston 47. In detail, the tubular member 57 is configured to enable the piston 47 to slide on its inner circumferential surface, and is provided in a state in which its movement along the axial direction with respect to the cylinder case 31 is restrained, between the cylinder case 31 and the piston 47. The tubular member 57 is formed such that its axial direction is along the axial direction (anteroposterior direction) of the cylinder case 31, and is composed of the top plate 58 disposed at the side of the ceiling wall part 35 of the cylinder case 31 so as to cover one end side in the axial direction, and a peripheral wall 59 disposed between the peripheral wall part 32 and the piston 47 in the cylinder case 31. Then, in detail, the tubular member 57 is housed in the cylinder case 31 so as to make the top plate 58 at the side of the front end 57a contact the sealing ring 66, and make a rear end 59a of the peripheral wall 59 at the side of a rear end 57b contact the stopper 32c formed on the peripheral wall part 32 of the cylinder case 31.

The top plate 58 serves as a presser plate disposed at the rear side of the sealing ring 66 which will be described later. In the case of the embodiment, the top plate 58 is disposed between the sealing ring 66 and the leading end wall part 52 of the piston 47 at the rear side of the sealing ring 66, so as to contact the sealing ring 66 and the leading end wall part 52. Then, the top plate 58 is configured to be capable of regulating a backward movement of the sealing ring 66 when the piston 47 moves backward. Further, the top plate 58 has the insertion hole 58a to allow the actuating pin 54 to be inserted through the top plate 58 in its center, and is provided so as to face the ejection holes 52a at the front side of the ejection holes 52a formed in the leading end wall part 52 of the piston main body 48. In detail, in the case of the embodiment, the top plate 58 is provided so as to block the fronts of the ejection holes 52a. In more detail, in the case of the embodiment, the outer shape of the top plate 58 is substantially the same as that of the leading end wall part 52, that is substantially oval whose long-axial direction is along the vertical direction. Further, the top plate 58 is configured to receive the pressing force of the driving gas G ejected from the ejection holes 52a during actuation of the squib 38, to press the sealing ring 66 in the direction of forward movement (front side).

The peripheral wall 59 is composed of curved plate parts 60 which are formed such that the area at the side of the inner circumference of the peripheral wall part 32 in the cylinder case 31 is divided into a plurality of pieces along the axial rotation direction, and are respectively jointed to the top plate 58. In the case of the embodiment, the curved plate parts 60 are provided at two places which are symmetrical with respect to the central axis of the cylinder case 31, and are respectively formed so as to extend backward along the axial direction of the cylinder case 31 from the top and bottom both ends of the top plate 58. In the case of the embodiment, the respective curved plate parts 60 are formed so as to make their right and left width sizes be substantially the same as the right and left width sizes of the top plate 58. The curved plate parts 60 are respectively formed such that their cross-sectional shapes are substantially quarter circular arcs, so as to respectively cover the upper side area and the lower side area of the piston 47. In other words, at the side of the leading end (the side of the top plate 58), the respective curved plate parts 60 are disposed at the areas except for the recessed areas on the right and left both sides between the leading end side tube part 34 of the peripheral wall part 32 in the cylinder case 31 and the leading end side tube part 51 of the tubular part 49 of the piston main body 48. Further, the respective curved plate parts 60 are formed such that their length sizes along the axial direction of the cylinder case 31 are substantially the same as the length size along the axial direction of the peripheral wall part 32 of the cylinder case 31. Further, the rear ends (base ends 60c) of the respective curved plate parts 60 are formed such that their cross sections are substantially taper shapes that reduce the diameter at the rear end side so as to correspond to the stopper 32c of the peripheral wall part 32. Further, the respective curved plate parts 60 are configured to enable the piston 47 housed in the cylinder case 31 to slide on their inner circumferential surfaces 60a. In detail, the piston 47 is made to slide on the curved plate parts 60 such that an outer circumferential surface 41b, whose outer diameter size is maximized, of the flange part 41 of the squib 38 is made to contact the inner circumferential surfaces 60a of the respective curved plate parts 60.

Figure 8:
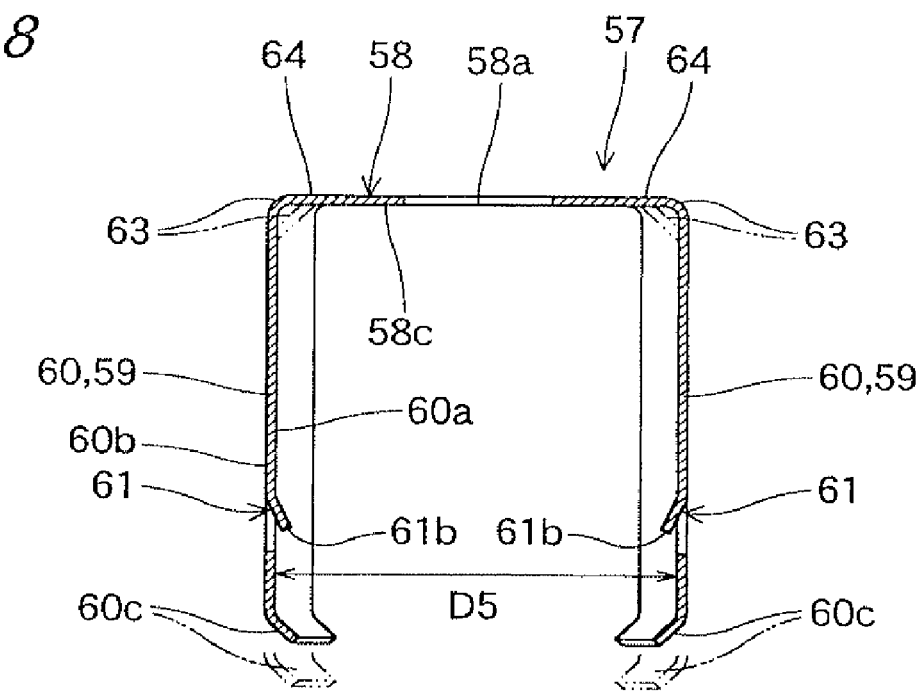
FIG. 8 is a longitudinal sectional view of the tubular member in FIG. 7.

Further, in the case of the embodiment, the tubular member 57 is configured to be externally mounted to the piston 47 such that a space between the curved plate parts 60 and 60 is pushed to open so as to space the curved plate parts 60 and 60 from one another, and the piston 47 is inserted thereinto. Then, the curved plate parts 60 and 60 are set such that the inner diameter size (spaced distance) D3 except for the regions of the locking protrusions in an initial state before diameter expansion, is set to a size with which the curved plate parts 60 and 60 can be tightly pressured onto the outer circumferential surface of the piston 47 (the outer circumferential surface 41b of the flange part 41) when the curved plate parts 60 and 60 are externally mounted to the piston 47. In detail, the respective curved plate parts 60 and 60 are formed such that the inner diameter size (spaced distance) D3 in an initial state before diameter expansion (refer to FIG. 8) is made slightly smaller than the outer diameter size D6 (refer to FIG. 5), that is the maximum outer diameter part in the piston 47, of the flange part 41.

Figure 7:
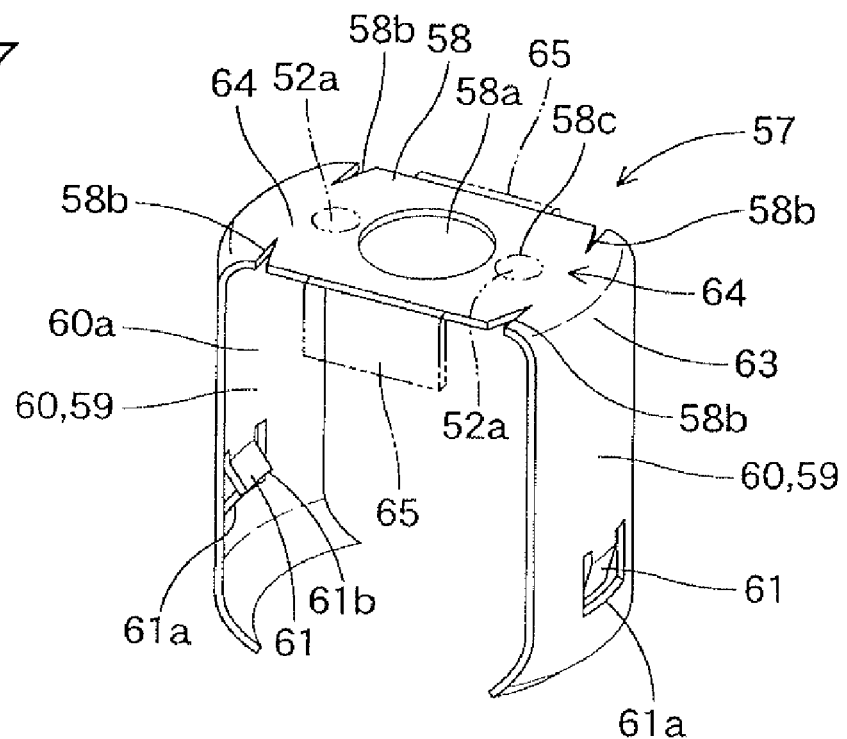
FIG. 7 is a perspective view of a tubular member used for the actuator of the embodiment.

In the respective curved plate parts 60 and 60, locking protrusions 61 formed so as to cut to stand parts of the curved plate parts 60 are formed in the regions corresponding to the locking recessed portion 42 in assembly with the outer circumference of the piston 47. In the case of the embodiment, the locking protrusions 61 are formed in two places, which are along the axial rotation direction of the tubular member 57 and are symmetrical with respect to a point of the central axis of the tubular member 57. In the case of the embodiment, the locking protrusions 61 are respectively formed at positions substantially center in the horizontal direction near the rear ends (the base ends 60c) of the respective curved plate parts 60. In detail, the respective locking protrusions 61 are formed such that substantially "laterally-facing U-shaped" incisions 61a are made in the curved plate parts 60 as shown in FIG. 7, and the regions surrounded by the incisions 61 a are cut to stand so as to make the sides of the rear ends 61b protrude toward the inner circumferential surface. That is, the respective locking protrusions 61 are formed to be inclined in the axial direction of the tubular member 57 (the axial direction of the cylinder case 31) so as to make the rear ends 61b protrude toward the inner circumferential surface. Further, in the case of the embodiment, the respective locking protrusions 61 lock the rim of the locking recessed portion 42 (the rear end of the flange part 41) by bending the rear ends (leading ends) 61b toward the axis in the regions corresponding to the locking recessed portion 42. The strength of locking of the locking protrusions 61 with the rim of the locking recessed portion 42 is set to a strength by which a backward movement of the piston 47 before actuation is regulated and a backward movement of the piston 47 is allowed during actuation of the squib 38. Note that, in the case of the embodiment, because the tubular member 57 is formed of a plate spring material having spring elasticity, when the piston 47 moves backward, the locking protrusions 61 let the flange part 41 of the squib 38 in the piston 47 be inserted into the tubular member 57 while being deformed so as to make the sides of the rear ends 61b in plane with the curved plate parts 60 surrounding those. However, after the flange part 41 and the sealing ring 67 which will be described later pass through the tubular member 57, the locking protrusions 61 are restored (refer to FIG. 10B). In the case of the embodiment, the locking protrusions 61 are restored so as to contact the front face side of the sealing ring 67 as will be described later after the backward movement of the piston 47, to press contact the sealing ring 67. However, without considering such a point, a tubular member may be formed of a sheet metal material without spring elasticity, and locking protrusions may be configured so as not to be restored after the piston moves backward.

Note that, as shown by the chain double-dashed line in FIG. 7, positioning pieces 65 disposed at the side of the outer circumference of the base side tube part 50 in the piston main body 48 may be provided to the tubular member 57 so as to extend backward along the axial direction from the right and left both edges of the top plate 58 in order to prevent the tubular member 57 from rotating with respect to the piston 47 when the tubular member 57 is externally mounted to the piston 47 (the piston main body 48).

That is, in the actuator A1 in the embodiment, a backward movement of the piston 47 before actuation is regulated by locking the rim of the locking recessed portion 42 to the locking protrusions 61. Further, in the actuator A1 in the embodiment, a forward movement of the piston 47 before actuation is regulated by the ceiling wall part 35 of the cylinder case 31. In detail, the piston 47 is housed in the cylinder case 31 such that the leading end wall part 52 in the piston main body 48 is made to contact the ceiling wall part 35 of the cylinder case 31 via the top plate 58 of the tubular member 57 and the sealing ring 66. In other words, a forward movement of the piston 47 before actuation is regulated by the top plate 58 supported by the ceiling wall part 35 via the sealing ring 66. Therefore, in the actuator A1 in the embodiment, the piston 47 is housed in the cylinder case 31 in a state in which the both movements forward and backward of the piston 47 are regulated.

Further, in the tubular member 57 in the embodiment, deforming parts 64 are formed near the rim in the vicinities of joining parts (bending regions) 63 with the respective curved plate parts 60 and 60 in the top plate 58. In the case of the embodiment, substantially V-shaped incisions 58b are formed near the upper edge and near the lower edge in the vicinities of the joining parts 63 with the respective curved plate parts 60 and 60 in the top plate 58, so as to intrude from the right and left both edge sides respectively. The regions between the incisions 58b and 58b serve as the deforming parts 64. Note that, in the case of the embodiment, as shown in FIG. 7, the deforming parts 64 (the incisions 58b) are formed at positions at sides of the edges outer than the areas to block the ejection holes 52a of the piston main body 48. The deforming parts 64 are configured to enable the top plate 58 to relatively move forward with respect to the peripheral wall 59 (the curved plate parts 60) during actuation. In other words, when the respective curved plate parts 60 forming the peripheral wall 59 move backward in line with a backward movement of the piston 47 during actuation of the squib 38, the top plate 58 is prevented from moving backward along with the peripheral wall 59 by deforming the regions of the deforming parts 64. In detail, in the case of the embodiment, when the respective curved plate parts 60 forming the peripheral wall 59 move so as to move the rear ends (the base ends 60c) to the rear side as shown by the chain double-dashed line in FIG. 8 along with a backward movement of the piston 47, the regions of the deforming parts 64 between the incisions 58b and 58b receive the energy of movement when the respective curved plate parts 60 move backward to be deformed to be made to bend (refer to the chain double-dashed line in FIG. 8), and by deforming the regions near the rim of the top plate 58 with the regions of the deforming parts 64, it is possible to prevent a central side region 58c (the region of the rim of the insertion hole 58a) contacting the sealing ring 66 in the top plate 58 from moving backward.

Figure 6:
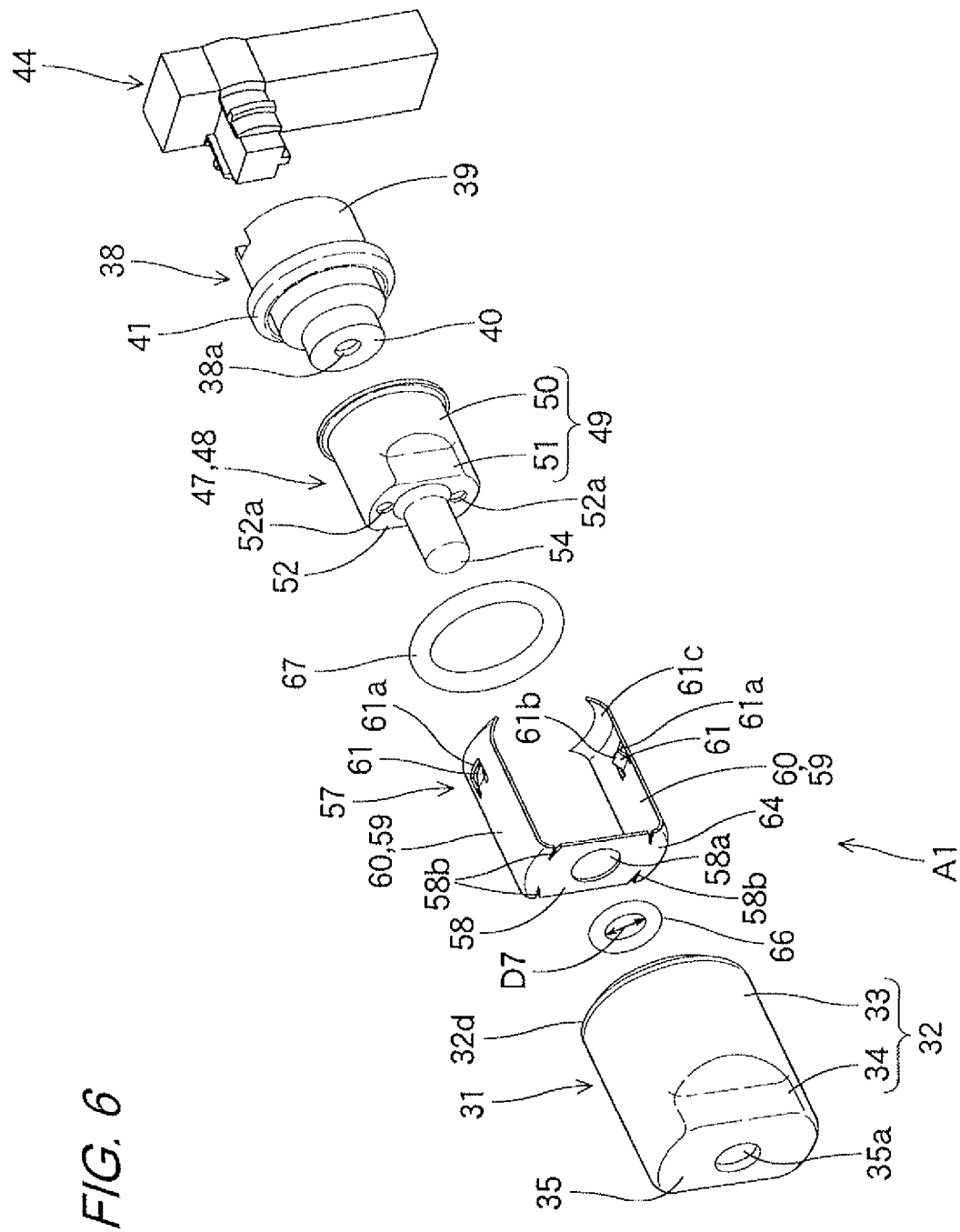
FIG. 6 is an exploded perspective view of the actuator of the embodiment.

The sealing ring 66 is composed of an O-ring made of a rubber-like elastic body in the case of the embodiment, and is configured to be capable of maintaining a state of sealing up a gap H between the actuating pin 54 and the through hole 35a provided in the ceiling wall part 35 (the gap H formed around the actuating pin 54 in the region of the through hole 35a through which the actuating pin 54 is made to pass) at the inner face side of the ceiling wall part 35 in the cylinder case 31. Further, the sealing ring 66 is provided so as to be relatively movable with respect to the actuating pin 54. In detail, the sealing ring 66 is formed such that the inner diameter size D7 (refer to FIG. 6) is made slightly smaller than the outer diameter size D2 of the actuating pin 54, and is externally mounted to the actuating pin 54 so as to be slightly expanded in diameter. In the case of the embodiment, the sealing ring 66 is provided to be sandwiched between the ceiling wall part 35 of the cylinder case 31 and the top plate (presser plate) 58 of the tubular member 57, so as to block the gap H between the actuating pin 54 and the through hole 35a around the actuating pin 54. Then, the sealing ring 66 prevents the driving gas G ejected from the ejection holes 52a from leaking out of the gap H between the actuating pin 54 and the through hole 35a before a movement of the piston 47 during actuation of the squib 38.

The sealing ring 67 is composed of an O-ring made of a rubber-like elastic body in the case of the embodiment. The sealing ring 67 is provided to be capable of blocking the gap with the peripheral wall part 32 of the cylinder case 31 to ensure the airtightness between the piston 47 and the peripheral wall part 32 near the rear end 48a of the piston main body 48 (near the base end 49a of the tubular part 49). In the case of the embodiment, the sealing ring 67 is set such that its width size (outer diameter size) in an unmounted state is greater than the gap between the tubular part 49 of the piston main body 48 and the peripheral wall part 32 of the cylinder case 31. That is, the sealing ring 67 is provided so as to be tightly pressured onto the inner circumferential surfaces 60a of the curved plate parts 60 (the peripheral wall 59) in the tubular member 57, an inner circumferential surface 32d of the peripheral wall part 32 of the cylinder case 31, and an outer circumferential surface 49c of the tubular part 49 of the piston main body 48, and to be further supported so as to contact the front face 41c of the flange part 41 (refer to FIGS. 4 and 5), that prevents the driving gas G ejected from the ejection holes 52a from leaking out of gaps between the peripheral wall part 32 or the curved plate parts 60 and the flange part 41 before a movement of the piston 47 during actuation of the squib 38. Note that the sealing ring 67 is disposed so as to contact the front face side of the restored locking protrusions 61 after the movement of the piston 47 (refer to FIG. 10B).

The actuator A1 in the embodiment is to be manufactured as follows. The squib 38 is integrated with the piston 47 in advance, and the tubular member 57 as well is manufactured in advance. Then, first, the piston 47 onto which the sealing ring 67 is externally mounted is inserted to the inside from the rear end side of the tubular member 57 in a state in which the curved plate parts 60 and 60 are pressed to open so as to space the curved plate parts 60 and 60 from one another, and the locking protrusions 61 are made to lock the rim of the locking recessed portion 42 while inserting the actuating pin 54 through the insertion hole 58a, to externally mount the tubular member 57 to the outer circumferential side of the piston

47. At this time, the leading end wall part 52 of the piston 47 is made to contact the top plate 58 of the tubular member 57. Further, in the case of the embodiment, because the tubular member 57 is formed of a plate spring material, if an operator releases his/her hold in a state in which the tubular member 57 is externally mounted to the outer circumferential side of the piston 47, the curved plate parts 60 and 60 are restored so as to narrow the spaced distance therebetween, and the curved plate parts 60 and 60 (the peripheral wall 59) of the tubular member 57 cover the side of the outer circumferential surface 41b of the flange part 41 in the piston 47 with no gap, and are disposed so as to be tightly pressured onto the outer circumferential surface 41b of the flange part 41. Thereafter, the sealing ring 66 is externally mounted to the actuating pin 54 protruding from the top plate 58. Then, the piston 47 is housed along with the tubular member 57 in the cylinder case 31 from the opening at the side of the base end 32b (the rear end) of the peripheral wall part 32 such that the actuating pin 54 is made to protrude from the through hole 35a provided in the ceiling wall part 35. At this time, the piston 47 is housed in the cylinder case 31 in a state in which the leading end wall part 52 in the piston main body 48 is made to contact the ceiling wall part 35 of the cylinder case 31 via the top plate 58 of the tubular member 57 and the sealing ring 66. Thereafter, the stopper 32c is formed such that the side of the base end 32b of the peripheral wall part 32 in the cylinder case 31 is crimped so as to protrude inward, to manufacture the actuator A1.

Then, the actuator A1 manufactured as described above is attached to the bag holder 10 with use of the mounting bracket 12. The mounting of the actuator A1 and the airbag apparatus M in a vehicle is carried out as follows. First, the airbag 21 in which the retainer 6 is inserted inside that is folded and the inflator 8 are attached to be assembled into the bag holder 10 to which the actuator A1 is attached, with the screw nuts 7. At this time, in a state in which the loop part 28b provided to the belt 28 extending from the flap 27 is made to protrude from the insertion hole 11b formed in the bottom wall part 11 of the bag holder 10, to be inserted through the actuating pin 54 of the actuator A1, and the locking of the loop part 28b with the actuating pin 54 is maintained, the side of the leading end face 54a of the actuating pin 54 is made to contact the supporting piece part 13 of the bag holder 10. Thereafter, the pad 17 is fastened with the rivets 16, to assemble the airbag apparatus M, and the airbag apparatus M is attached to the steering wheel main body 1 which has been already attached to the vehicle. Note that, at the time of mounting the airbag apparatus M in the vehicle, the connector 44 disposed at the leading end side of the lead wire (whose reference numeral is omitted in the drawing) extending from the control device 70 is connected to the terminal 38b of the squib 38 of the actuator A1, and a predetermined lead wire electrically connected to the control device 70 is to be connected to the inflator 8 as well.

Figure 10A:
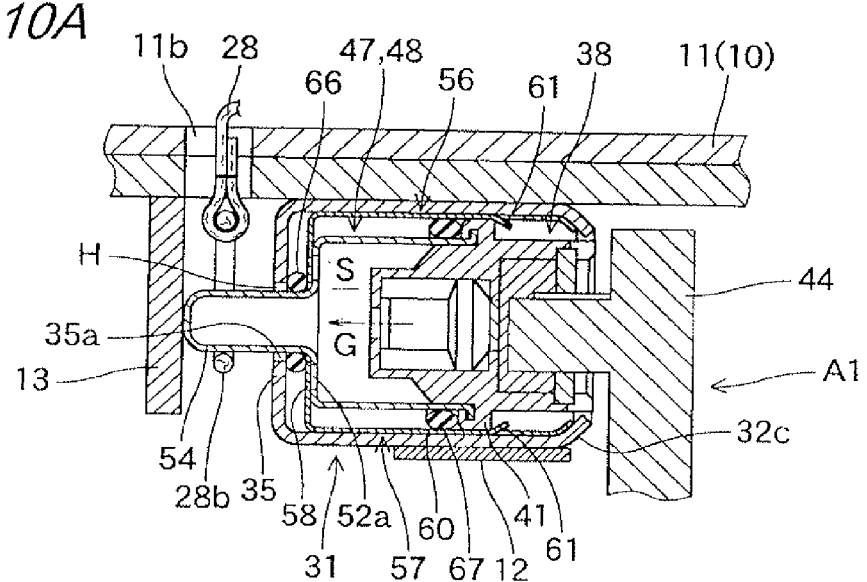
FIGS. 10A and 10B are longitudinal sectional views of the actuator of the embodiment before actuation and after actuation.
Figure 10B:
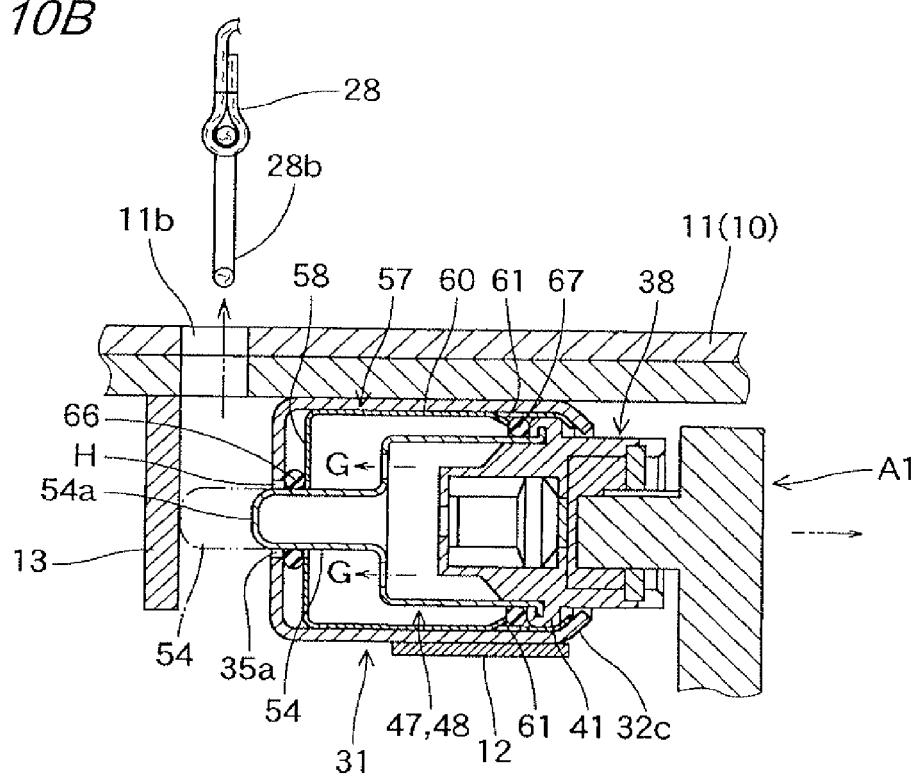

In the actuator A1 in the embodiment, as shown in FIG. 10A, when an actuation signal from the control device 70 is received to ignite the squib 38, to burn the explosive inside thereof to generate the driving gas G, the driving gas G filling inside the space S surrounded by the piston main body 48 and the squib 38 is ejected into the cylinder case 31 from the ejection holes 52a formed in the leading end wall part 52 of the piston main body 48. In the actuator A1 in the embodiment, before actuation of the squib 38, the ejection holes 52a are blocked with the top plate 58. However, the driving gas G ejected from the ejection holes 52a presses the top plate 58 forward (to the side of the ceiling wall part 35) so as to compress the sealing ring 66, and the driving gas G flows into a space between the cylinder case 31 and the piston main body 48 from a gap formed between the top plate 58 and the leading end wall part 52. Then, the driving gas G fills the space between the cylinder case 31 and the piston main body 48, to press the flange part 41 of the squib 38 integrated with the piston 47 backward, and the entire piston 47 receives the pressing force of the driving gas G to move backward along the axial direction of the cylinder case 31. Because the actuating pin 54 drops out of the loop part 28b provided to the belt 28, as shown in FIG. 10B, in line with the backward movement of the piston 47, and the actuating pin 54 unlocks the locking of the belt 28, the flap 27 coupled to the belt 28 opens the exhaust hole 25 of the airbag 21 as shown in FIG. 9B, to discharge the inflating gas from the exhaust hole 25.

Then, in the actuator A1 in the embodiment, the sealing ring 66 to seal up the gap H between the actuating pin 54 and the through hole 35a provided in the ceiling wall part 35 (the gap H formed around the actuating pin 54 in the region of the through hole 35a through which the actuating pin 54 is made to pass) is provided at the inner face side of the ceiling wall part 35 in the cylinder case 31 from which the actuating pin 54 is made to protrude, and the sealing ring 66 is made relatively movable with respect to the actuating pin 54 while maintaining the state of sealing up the gap H between the actuating pin 54 and the through hole 35a. In detail, in the actuator A1 in the embodiment, the top plate 58 serving as a presser plate, which is formed of a plate spring material having stiffness higher than that of the sealing ring 66, and which is configured to be relatively movable with respect to the actuating pin 54, and is capable of regulating a backward movement of the sealing ring 66 when the piston 47 moves backward, is provided at the rear side of the sealing ring 66. Therefore, in the actuator A1 in the embodiment, during actuation of the squib 38, it is possible to seal up the gap H between the actuating pin 54 and the through hole 35a before the actuating pin 54 moves backward by the sealing ring 66, and even when the actuating pin 54 moves backward along with the piston 47, it is possible to maintain the state of sealing up the gap H between the actuating pin 54 and the through hole 35a by the sealing ring 66 which is regulated in its backward movement by the top plate 58, and is pressed to be deformed by the top plate 58. Therefore, during actuation of the squib 38, it is possible to prevent the driving gas G from leaking out of the gap H between the actuating pin 54 and the through hole 35a as much as possible, and it is possible to allow the actuating pin 54 to rapidly move backward. In particular, in the case of the embodiment, because the top plate 58 is formed to have stiffness higher than that of the sealing ring 66, the sealing ring 66 is tightly pressured toward the ceiling wall part 35 uniformly, and the sealing ring 66 is sandwiched between the top plate 58 and the ceiling wall part 35 to be compressed to be deformed, and is capable of uniformly sealing up the gap H between the actuating pin 54 and the through hole 35a over the entire circumference around the actuating pin 54.

Accordingly, in the actuator A1 in the embodiment, it is possible to prevent gas leaks from around the actuating pin 54, and to allow the actuating pin 54 to rapidly move backward during actuation.

Further, in the actuator A1 in the embodiment, because the gap H between the actuating pin 54 and the through hole 35a is sealed up by the sealing ring 66 from the time before actuation of the squib 38 until the actuating pin 54 moves backward after actuation of the squib 38, it is possible to prevent a flame during actuation of the squib 38 from being ejected from the gap H between the actuating pin 54 and the through hole 35a to the outside. Further, in the actuator A1 in the embodiment, because the gap H between the actuating pin 54 and the through hole 35a is always sealed up by the sealing ring 66 when the actuator A1 is mounted in a vehicle, the resistance to moisture or the like as well is satisfactory. In particular, in the actuator A1 in the embodiment, when the actuator A1 is mounted in a vehicle, because the ejection holes 52a from which the driving gas G discharged from the squib 38 is ejected are blocked by the top plate 58 as will be described later, the resistance to moisture or the like can be satisfactorily retained.

Note that, an actuator having a configuration in which a presser plate is not provided at the rear side of a sealing ring may be used. When a presser plate is not provided in an actuator, in detail, a sealing ring may be configured to prevent the backward movement when the actuating pin is going to move backward with use of a biasing means such as a spring, and moreover, the sealing ring may be configured to prevent the backward movement with use of gas pressure of the driving gas itself going to pass through the gap between the actuating pin and the through hole. Further, in the actuator A1 in the embodiment, the top plate 58 of the tubular member 57 serves as a presser plate. However, it is a matter of course that the presser plate is not necessarily integrated with the tubular member, and as illustrated in an actuator A2 which will be described later, the presser plate may be disposed separately from the tubular member. Further, as illustrated in an actuator A3 which will be described later, only a presser plate may be provided in an actuator having a configuration which is not provided with a tubular member.

In the actuator A1 in the embodiment, the squib 38 is provided integrally with the piston 47, and the piston 47 is configured such that the leading end side of the squib 38 is covered therewith and the actuating pin 54 is made to protrude therefrom, and the ejection holes 52a from which the driving gas G can be ejected are provided around the actuating pin 54. Further, in the actuator A1 in the embodiment, the ejection holes 52a are provided to be capable of pressing the top plate 58 serving as a presser plate disposed at the rear side of the sealing ring 66, in the direction of forward movement by the driving gas G ejected from the ejection holes 52a. Therefore, in the actuator A1 in the embodiment, during actuation, when the driving gas G discharged from the squib 38 is ejected from the ejection holes 52a into the cylinder case 31, the driving gas G presses the top plate (presser plate) 58 disposed at the rear side of the sealing ring 66 in the direction of forward movement, i.e., toward the ceiling wall part 35, and the sealing ring 66 receives the pressing force of the driving gas G to be tightly pressured toward the ceiling wall part 35 by the top plate (presser plate) 58. In other words, in the actuator of the embodiment, because the sealing ring 66 is tightly pressured toward the ceiling wall part 35 via the top plate (presser plate) 58 by the driving gas G, and at this time, the sealing ring 66 is compressed to be deformed so as to block the gap H between the actuating pin 54 and the through hole 35a, it is possible to prevent the driving gas G from leaking out of the gap H between the actuating pin 54 and the through hole 35a as much as possible. Without considering such a point, it is a matter of course that an actuator configured such that ejection holes from which a driving gas can be ejected are provided in a piston so as to be substantially perpendicular to the axial direction of the actuating pin, and the presser plate does not block the ejection holes, may be used.

Further, in the actuator A1 in the embodiment, the ejection holes 52a are disposed to face the top plate 58 at the rear of the top plate (presser plate) 58, and are configured to be capable of ejecting the driving gas G along the axial direction of the actuating pin 54 therefrom. Therefore, because the driving gas G discharged from the squib 38 is ejected to be along the axial direction of the actuating pin 54 from the ejection holes 52a into the cylinder case 31, it is possible to make the piston 47 rapidly move backward during actuation. Further, because the driving gas G ejected from the ejection holes 52a presses the top plate (presser plate) 58 forward along the axial direction of the actuating pin 54, the sealing ring 66 can be tightly pressured toward the ceiling wall part 35 directly by the top plate 58. Note that, without considering such a point, an actuator having a configuration in which ejection holes provided in a piston are configured to be capable of ejecting a driving gas so as to be obliquely cross the axial direction of the actuating pin, and to be capable of pressing a presser plate in the direction of forward movement by the driving gas ejected from the ejection holes, may be used.

Moreover, in the actuator A1 in the embodiment, because the tubular member 57 serving as a temporary joint member that allows a backward movement of the piston 47 during actuation, and regulates a backward movement of the piston 47 before actuation, is provided between the peripheral wall part 32 and the piston 47 in the cylinder case 31, it is possible to reliably regulate a backward movement of the piston 47 until actuation of the squib 38. Without considering such a point, it is a matter of course that an actuator having a configuration which is not provided with a temporary joint member, may be used.

Furthermore, in the actuator A1 in the embodiment, the top plate 58 serving as a presser plate is provided at the rear side of the sealing ring 66, and a forward movement of the piston 47 before actuation is regulated by the top plate (presser plate) 58 supported by the ceiling wall part 35 via the sealing ring 66. Therefore, the state in which the actuating pin 54 protrudes from the ceiling wall part 35 of the cylinder case 31 can be stabilized before mounting onto a mounting region, which makes the handleability thereof satisfactory.

Furthermore, in the actuator A1 in the embodiment, the tubular member 57 which is formed by performing bending work on a sheet metal material (a plate spring material in the case of the embodiment), that makes the piston 47 slidable on the inner circumferential surface thereof, is provided in a state in which a movement thereof along the axial direction with respect to the cylinder case 31 is restricted, between the peripheral wall part 32 and the piston 47 in the cylinder case 31. Then, the tubular member 57 is formed as a temporary joint member which is provided with the locking protrusions 61 which are formed to be cut to stand so as to protrude toward the inner circumferential surface, and are configured to lock the rim of the locking recessed portion 42 provided on the piston 47 when the tubular member 57 is assembled with the outer circumference of the piston 47, to be capable of regulating a backward movement of the piston 47 before actuation, and of unlocking the locking so as to allow a backward movement of the piston 47 during actuation. That is, in the actuator A1 in the embodiment, because the tubular member 57 serving as a temporary joint member can be formed by merely performing bending work on some part of a sheet metal material (a plate spring material) before bending work, that forms the tubular member 57, to form the locking protrusions 61, and by performing bending work on the entire material, it is possible to easily form the temporary joint member. Further, in the actuator A1 in the embodiment, provided that the locking protrusions 61 are formed in advance on the sheet metal material forming the tubular member 57, and the tubular member 57 formed by bending work so as to be capable of being externally mounted to the circumference of the piston 47, is externally mounted to the piston 47 (is provided so as to cover the piston 47), and thereafter, the piston 47 to which the tubular member 57 is externally mounted is housed in the cylinder case 31, the piston 47 is housed in the cylinder case 31 in a state in which the rim of the locking recessed portion 42 is locked by the locking protrusions 61, which makes it easy to manufacture the actuator A1. Note that, in a case in which the tubular member is formed of a formation material which is easy to perform bending work thereto, the tubular member may be formed such that a sheet metal material on which locking protrusions are formed in advance is made to bend to be tubular so as to be provided around the piston, and at the same time, the tubular member can be externally mounted to the piston. Without considering such a point, it is a matter of course that the temporary joint member may be not necessarily formed of a tubular member formed by performing bending work on a sheet metal material.

Furthermore, in the actuator A1 in the embodiment, because the tubular member 57 is composed of the top plate 58 serving as a presser plate disposed at the side of the ceiling wall part 35 of the cylinder case 31 so as to cover one end side in the axial direction, and the peripheral wall 59 having the locking protrusions 61, which is provided between the peripheral wall part 32 and the piston 47 in the cylinder case 31, a number of components can be reduced as compared with a case in which a presser plate and a tubular member are separately provided. Further, in the actuator A1 in the embodiment, because the tubular member 57 has the top plate 58 through which the actuating pin 54 is inserted, when the tubular member 57 in which the piston 47 is housed is assembled with the cylinder case 31, the actuating pin 54 is supported by the rim of the insertion hole 58*a* provided in the top plate 58, to be hard to wobble with respect to the cylinder case 31, and the actuating pin 54 can be made to easily protrude from the cylinder case 31 in assembly with the cylinder case 31, which makes the assembly workability in assembly of the piston 47 with the cylinder case 31 satisfactory. Without considering such a point, it is a matter of course that a tubular member formed to have only a peripheral wall without a top plate, may be used.

Furthermore, in the actuator A1 in the embodiment, the deforming parts 64 which are deformable are provided so as to enable the top plate 58 to relatively move forward with respect to the peripheral wall 59 (the curved plate parts 60 and 60) during actuation, near the rim in the vicinities of the joining parts 63 with the peripheral wall 59 (the curved plate parts 60 and 60) in the top plate 58. Therefore, in the actuator A1 in the embodiment, during actuation, even if there is a risk that the peripheral wall 59 (the curved plate parts 60 and 60) in which the locking protrusions 61 are locked in the locking recessed portion 42, moves backward in line with the piston 47 due to great kinetic energy of the piston 47 moving backward, the deforming parts 64 provided near the rim of the top plate 58 are deformed, to enable the top plate 58 to relatively move forward with respect to the peripheral wall 59. In other words, because it is possible to prevent the top plate 58 from moving backward so as to separate from the sealing ring 66 in line with a backward movement of the peripheral wall 59 by deforming the deforming parts 64, the sealing ring 66 can be reliably tightly pressured toward the ceiling wall part 35 by the top plate 58 serving as a presser plate. Note that, in the embodiment, the substantially V-shaped incisions 58*b* and 58*b* which intrude from the right and left both sides are formed in the vicinities of the joining parts 63 with the respective curved plate parts 60 and 60 in the top plate 58, and the regions between the incisions 58*b* and 58*b* serve as the deforming parts 64. However, the shape of the deforming parts is not limited thereto, and may be formed such that notched portions which thin a plate thickness are provided or slit-like incisions successively provided are provided in regions in the vicinities of the joining parts with the respective curved plate parts in the top plate. Without considering such a point, it is a matter of course that deforming parts may be not necessarily provided near the rim of the top plate.

Furthermore, in the actuator A1 in the embodiment, the tubular member 57 is formed of a plate spring material, and the peripheral wall 59 is composed of the curved plate parts 60 which are formed such that the area at the side of the inner circumference of the peripheral wall part 32 in the cylinder case 31 is divided into a plurality of pieces along the axial rotation direction, and are respectively jointed to the top plate 58. Then, the respective curved plate parts 60 are formed such that the inner diameter size D5 (spaced distance) except for the regions of the locking protrusions 61 in an initial state before diameter expansion, is set to a size with which the curved plate parts 60 and 60 can be tightly pressured onto the outer circumferential surface of the piston 47 (the outer circumferential surface 41*b* of the flange part 41 in the squib 38). Therefore, in the actuator A1 in the embodiment, at the time of manufacturing the actuator A1, when the respective curved plate parts 60 and 60 in the tubular member 57 which has been manufactured in advance are expanded in diameter (expanded to open), and the piston 47 is housed inside thereof, the respective curved plate parts 60 and 60 are respectively restored, to be provided so as to be tightly pressured onto the outer circumferential surface of the piston 47 (the outer circumferential surface 41*b* of the flange part 41 in the squib 38). Then, because the locking protrusions 61 lock the rim of the locking recessed portion 42 in a state in which the piston 47 is housed inside thereof, it is possible to prevent the piston 47 from moving backward with respect to the tubular member 57, and there is no need for an operator to hold the piston 47 with his/her hands or the like when the tubular member 57 in which the piston 47 is housed is assembled with the cylinder case 31, which makes the assembly workability in assembly of the piston 47 with the cylinder case 31 satisfactory. Without considering such a point, it is a matter of course that the tubular member may be not necessarily formed of a plate spring material, and may be merely formed of a sheet metal material.

Furthermore, in the actuator A1 in the embodiment, because the tubular part 49 of the piston main body 48 in the piston 47 and the peripheral wall part 32 in the cylinder case 31 are formed such that their cross-sectional shapes along the axial rotation direction are substantially noncircular so as to make a rotation along the axial rotation direction of the piston 47 with respect to the peripheral wall part 32 impossible, it is possible to prevent the piston 47 from rotating with respect to the cylinder case 31, and to prevent the terminal 38*b* of the squib 38 provided in the piston 47 from rotating when the actuator A1 is mounted in a vehicle. Therefore, it is possible to prevent wrong assembly when the connector 44 disposed at the leading end side of the lead wire is connected to the terminal 38*b* of the squib 38. Without considering such a point, it is a matter of course that the tubular part of the piston main body and the peripheral wall part in the cylinder case may be both formed such that their cross-sectional shapes are circular. Note that, in the actuator A1 in the embodiment, because the tubular part 49 of the piston main body 48 and the peripheral wall part 32 in the cylinder case 31 are formed to be noncircular such that the regions of the leading end sides (the leading end side tube parts 34 and 51) are recessed with respect to the regions of the base sides (the base side tube parts 33 and 50), as compared with a case in which the entire area along the axial direction is formed into a cylinder shape, a volume of the piston main body 48 to be filled with the driving gas G (the space S surrounded by the piston main body 48 and the squib 38), and a volume of the cylinder case 31 (the space between the piston main body 48 and the cylinder case 31) can be made less, and it is possible to make the piston 47 rapidly move backward during actuation.

Furthermore, in the actuator A1 in the embodiment, because the sealing ring 67 capable of ensuring airtightness between the piston 47 and the peripheral wall part 32 in the cylinder case 31 is provided at the base side of the piston 47 (at the side of the rear end 48a of the piston main body 48), it is possible to prevent the driving gas G from leaking out of the gap between the piston 47 and the peripheral wall part 32 during actuation of the squib 38. Note that, in the actuator A1 in the embodiment, the tubular part 49 of the piston main body 48 is formed to have a gap over the entire area along the axial rotation direction between the tubular part 49 and the peripheral wall part 32 in the cylinder case 31 at the base side, and the driving gas G ejected from the ejection holes 52a to fill the space between the piston main body 48 and the cylinder case 31 flows backward through the gap between the tubular part 49 and the peripheral wall part 32, to press the sealing ring 67 backward to make the piston 47 move backward. However, because the rear side of the sealing ring 67 is supported by the flange part 41 of the squib 38, the sealing ring 67 receives the pressing force of the driving gas G to be tightly pressured onto the peripheral wall part 32 and the tubular part 49 to be deformed, which makes it possible to retain the sealing performance between the piston 47 and the peripheral wall part 32 satisfactory by the sealing ring 67 even when the piston 47 moves backward.

Note that, in the actuator A1 in the embodiment, the actuating pin 54 is formed to be hollow so as to be continued from the piston main body 48 up to the leading end face 54a. That is, in the actuator A1 in the embodiment, because the piston main body 48 and the actuating pin 54 can be formed to have a substantially uniform thickness, the actuator A1 can be manufactured by performing press-working on a sheet metal material having a uniform plate thickness, which makes it easy to manufacture the actuator A1 as compared with a case in which an actuating pin is manufactured to be solid over its entire length by press-working.

Figure 11:
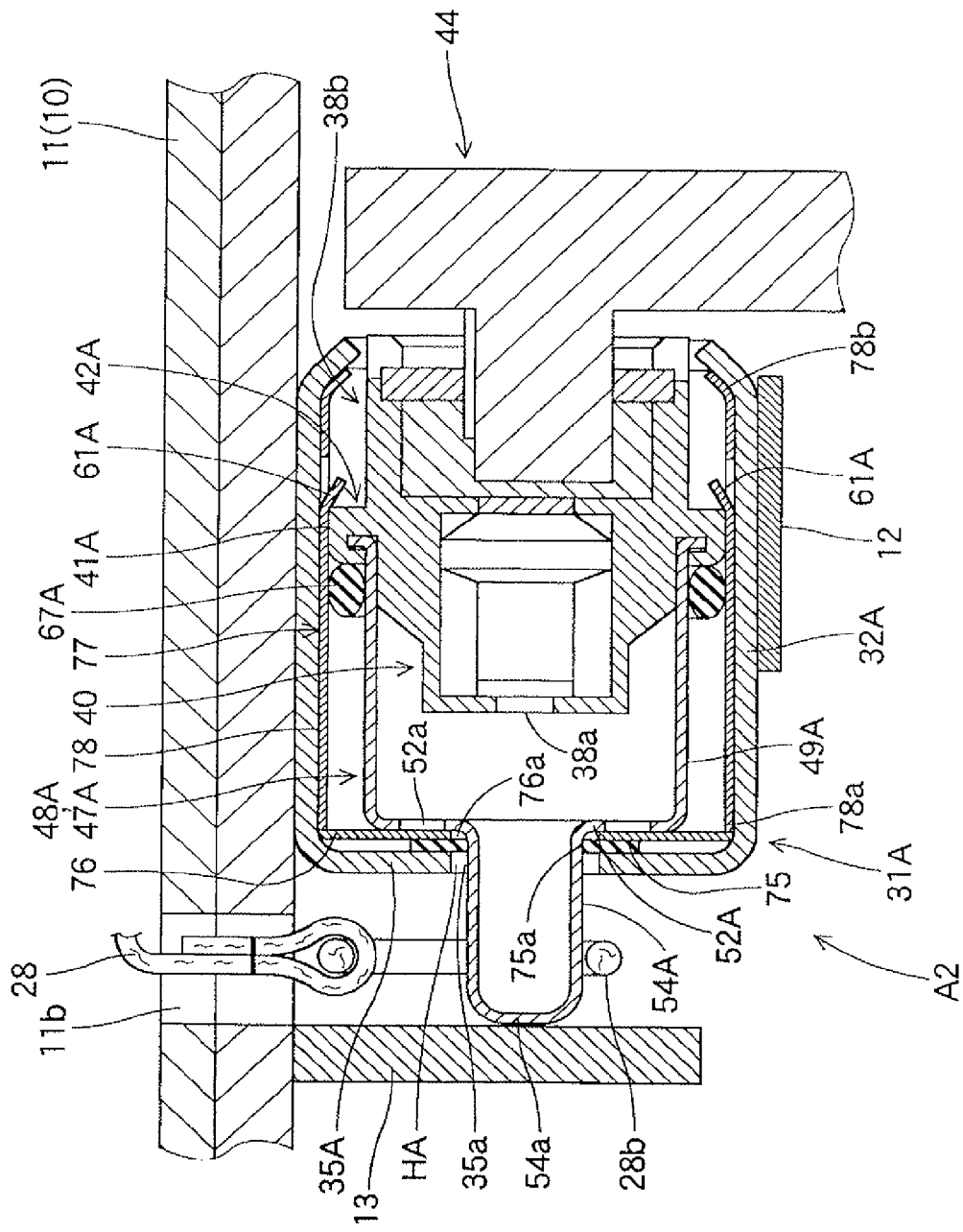
FIG. 11 is a longitudinal sectional view of an actuator, that is another mode of the present invention.

Further, in the actuator A1 in the embodiment, the sealing ring 66 is composed of an O-ring. However, as the actuator A2 shown in FIG. 11, a sealing ring 75 which is formed of a rubber-like elastic body and which has a fitting hole 75a into which the actuating pin 54 can be inserted to fit, that is flat-plate discoid, may be used. Further, in the actuator A2 in FIG. 11, a presser plate 76 and a tubular member 77 serving as a temporary joint member are separately formed. Further, in the actuator A2 in FIG. 11, a peripheral wall part 32A of a cylinder case 31A and a tubular part 49A of a piston main body 48A are formed to be cylindrical. In the actuator A2 in FIG. 11, because the configurations of the members other than the sealing ring 75, the presser plate 76, and the tubular member 77 are the same as those of the actuator A1 described above except for the point that the shapes of the cylinder case 31A and the piston main body 48A are slightly different from those of the actuator A1, the same members are denoted by the same reference numerals suffixing "A" in the drawing, and detailed descriptions thereof will be omitted.

The presser plate 76, which is substantially discoid, is formed of a sheet metal material having stiffness higher than that of the sealing ring 75, and in the same way as the top plate 58 in the actuator A1 described above, the presser plate 76 is configured such that an insertion hole 76a through which an actuating pin 54A can be inserted is provided, to be relatively movable with respect to the actuating pin 54A, and is capable of preventing the sealing ring 75 from moving backward when the piston 47A moves backward.

Figure 12:
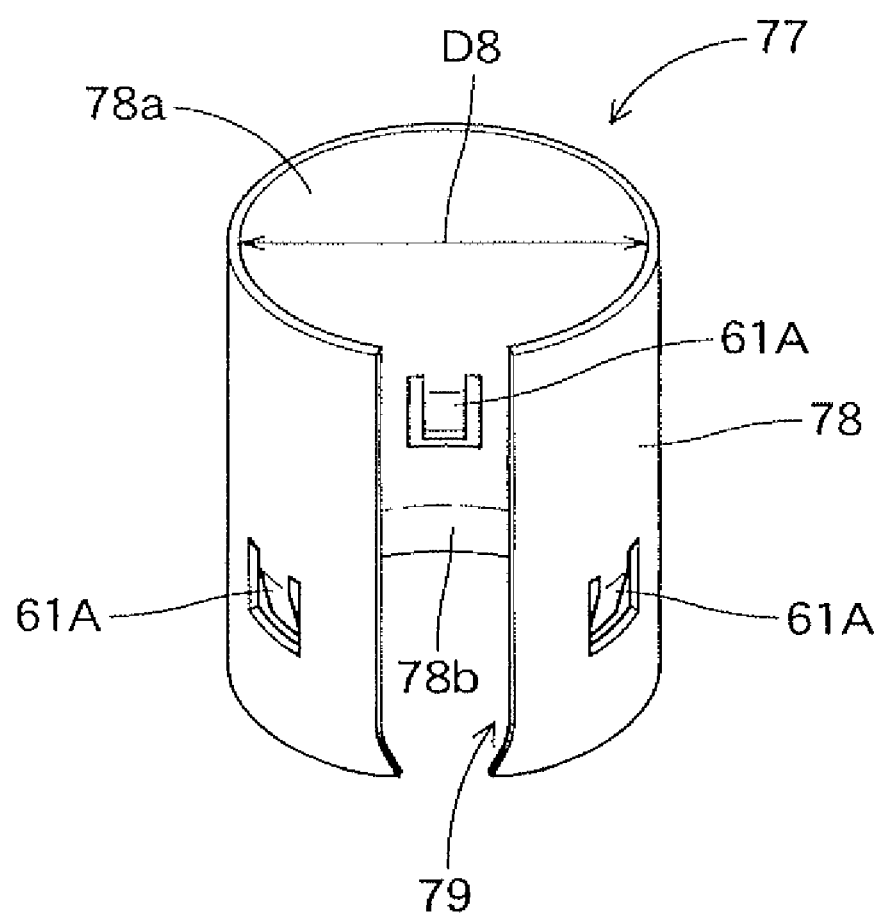
FIG. 12 is a perspective view of a tubular member used for the actuator in FIG. 11.

The tubular member 77 is formed so as to perform bending work on a plate spring material such as an SPCC, and has a peripheral wall 78 which is formed such that its axial direction is along the axial direction of the cylinder case 31A, and is formed to open the both end sides in the axial direction (the anteroposterior both end sides). The peripheral wall 78 is, as shown in FIG. 12, divided axially over the entire area by one slit 79 formed along the axial direction (the anteroposterior direction). The tubular member 77 (the peripheral wall 78) is provided between a peripheral wall part 32A of the cylinder case 31A and the piston 47A, and is formed such that the length size at the side of the direction along the axial direction is made substantially the same as the length size of the peripheral wall part 32A, and a front end 78a thereof is made to contact the presser plate 76, and a rear end 78b is a substantially taper shape in cross section that reduces the diameter at the rear end side so as to correspond to the stopper 32c of the peripheral wall part 32A. Further, in the same way as the tubular member 57 described above, locking protrusions 61A are formed on the peripheral wall 78. The locking protrusions 61A are formed at three places, which are in a substantially radial pattern centering on the central axis of the tubular member 77 on the tubular member 77. Further, in the peripheral wall 78 of the tubular member 77, the inner diameter size except for the regions of the locking protrusions 61A in an initial state before diameter expansion, is set to a size with which the peripheral wall 78 can be tightly pressured onto the outer circumferential surface of the piston 47A (the outer circumferential surface 41b of the flange part 41A). In detail, the peripheral wall 78 is formed such that the inner diameter size D8 (refer to FIG. 12) in an initial state before diameter expansion is set to be slightly smaller than an outer diameter size of the flange part 41A, that is the maximum outer diameter part in the piston 47A.

In the actuator A2 having the configuration as well, because the configurations except for the point that the shape of the sealing ring 75 is different, and the presser plate 76 and the tubular member 77 serving as a temporary joint member are separately formed, are the same as those in the actuator A1 described above, actions and effects which are the same as those in the actuator A1 described above can be obtained. In the actuator A2 having the above-described configuration as well, because the presser plate 76 is formed to have stiffness higher than that of the sealing ring 75, the presser plate 76 uniformly tightly presses the sealing ring 75 toward a ceiling wall part 35A, and the sealing ring 75 is sandwiched between the presser plate 76 and the ceiling wall part 35A to be compressed to be deformed, to be capable of uniformly sealing up a gap HA between the actuating pin 54A and the through hole 35a over the entire circumference around the actuating pin 54A. Further, in the actuator A2 having the above-described configuration, the tubular member 77 is formed of a plate spring material, and is composed of the peripheral wall 78 having the locking protrusions 61A, which is a substantially cylinder shape whose both end sides in the axial direction are open, and the peripheral wall is divided axially over the entire area by the one slit 79 formed along the axial direction, and the inner diameter size D8 except for the regions of the locking protrusions 61A in an initial state before diameter expansion, is set to a size with which the peripheral wall can be tightly pressured onto the outer circumferential surface of the piston 47A (the outer circumferential surface 41b of the flange part 41A). Therefore, at the time of manufacturing the actuator A2, when the piston 47 is housed inside thereof in a state in which the tubular member 77 which has been manufactured in advance is expanded in diameter so as to expand the opening of the slit 79, the tubular member 77 is restored, to be provided so as to be tightly pressured onto the outer circumferential surface of the piston 47A (the outer circumferential surface 41b of the flange part 41A). Then, in the actuator A2 having the configuration as well, because the locking protrusions 61A lock the rim of a locking recessed portion 42A in a state in which the piston 47A is housed inside thereof, it is possible to prevent the piston 47A from moving backward with respect to the tubular member 77, and there is no need for an operator to hold the piston 47A with his/her hands or the like when the tubular member 77 in which the piston 47A is housed is assembled with the cylinder case 31A, which makes the assembly workability in assembly of the piston 47A with the cylinder case 31A satisfactory.

Figure 13A:
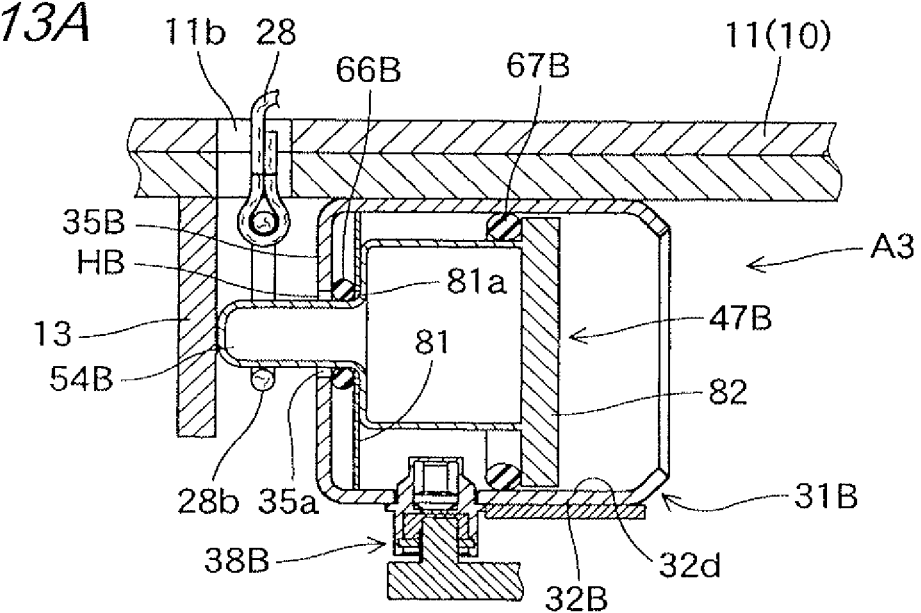
FIGS. 13A and 13B are longitudinal sectional views showing an actuator, that is yet another mode of the present invention, and showing the actuator before actuation and after actuation.
Figure 13B:
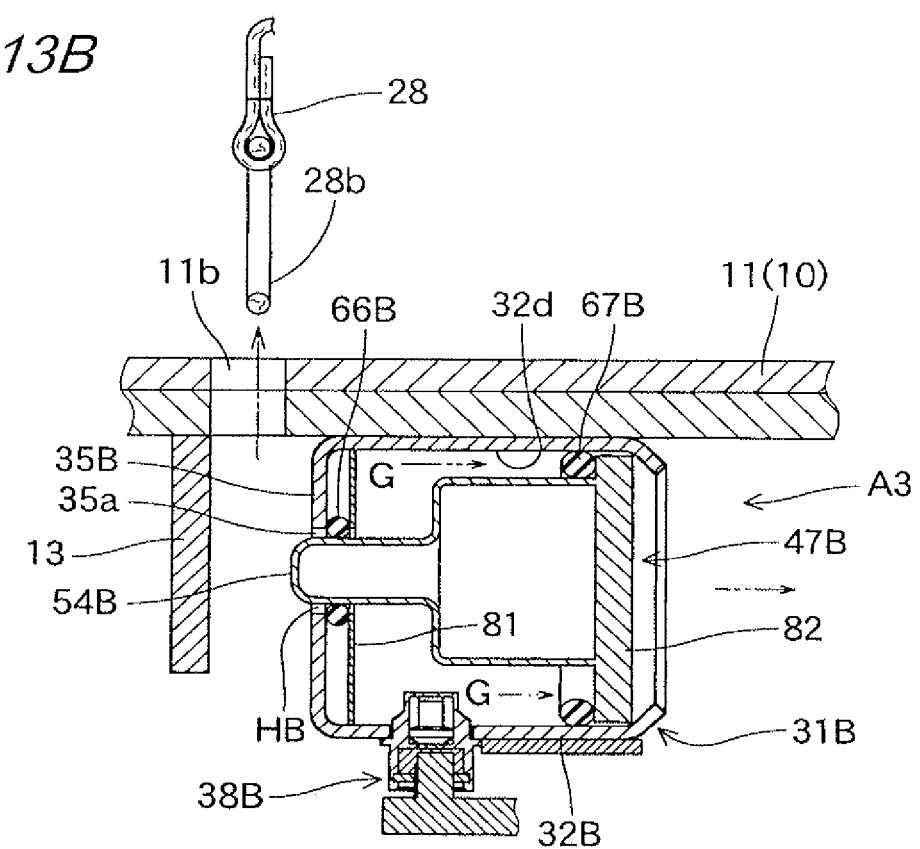

Further, in the actuators A1 and A2 described above, the squibs 38 and 38A are formed integrally with the pistons 47 and 47A. However, as in the actuator A3 shown in FIGS. 13A and 13B, a squib 38B may be provided separately from a piston 47B. In the actuator A3 shown in FIGS. 13A and 13B, the squib 38B is formed separately from the piston 47B, to be jointed to a peripheral wall part 32B of a cylinder case 31B. Note that, in the actuator A3, because the other configurations of the cylinder case 31B, the squib 38B, the piston 47B, a sealing ring 66B, and a sealing ring 67B are the same as those of the cylinder case 31, the squib 38, the piston 47, the sealing ring 66, and the sealing ring 67 in the actuator A1 described above except for the point that the position at which the squib 38B is disposed is different, the same members are denoted by the same reference numerals suffixing "B" in the drawing, and detailed descriptions thereof will be omitted. In the actuator A3, a tubular member (a temporary joint member) is not provided, and the piston 47B has a flange part 82 slidable on the inner circumferential surface 32d of the peripheral wall part 32B of the cylinder case 31B at the base side (the rear end side). Further, a substantially discoid presser plate 81 which is formed of a sheet metal material having stiffness higher than that of the sealing ring 66B, is provided between a leading end wall part 52B of the piston 47B and the sealing ring 66B disposed at an inner circumferential surface side of the ceiling wall part 35B of the cylinder case 31B. The presser plate 81 is, in the same way as the top plate 58 in the actuator A1 described above and the presser plate 76 in the actuator A2, configured such that an insertion hole 77a through which an actuating pin 54B can be inserted is provided, to be relatively movable with respect to the actuating pin 54B, and is capable of preventing the sealing ring 66B from moving backward when the piston 47B moves backward.

In the actuator A3 having the configuration, during actuation, when the squib 38B is ignited, the driving gas G fills the space between the piston 47B and the cylinder case 31B, to press the flange part 82 of the piston 47B backward. Then, the entire piston 47B receives the pressing force of the driving gas G to move backward along the axial direction of the cylinder case 31B (refer to FIG. 13B). In the actuator A3 as well, the sealing ring 66B to seal up the gap HB between the actuating pin 54B and the through hole 35a provided in the ceiling wall part 35B is provided at the inner face side of the ceiling wall part 35B in the cylinder case 31B from which the actuating pin 54B is made to protrude. Because the sealing ring 66B is relatively movable with respect to the actuating pin 54B while maintaining the state of sealing up the gap HB between the actuating pin 54B and the through hole 35a, during actuation of the squib 38B, it is possible to seal up the gap HB between the actuating pin 54B and the through hole 35a before a backward movement of the actuating pin 54B by the sealing ring 66B, and when the actuating pin 54B moves backward along with the piston 47B as well, it is possible to maintain the state of sealing up the gap HB between the actuating pin 54B and the through hole 35a by the sealing ring 66B. Therefore, during actuation of the squib 38B, it is possible to prevent the driving gas G from leaking out of the gap HB between the actuating pin 54B and the through hole 35a as much as possible, and to allow the actuating pin 54B to rapidly move backward. Further, in the actuator A3 having the above-described configuration, because the presser plate 81 is provided at the rear side of the sealing ring 66B, a backward movement of the sealing ring 66B is regulated by the presser plate 81, and the sealing ring 66B is tightly pressured toward the ceiling wall part 35B uniformly by the presser plate 81 formed to have stiffness higher than that of the sealing ring 66B. Therefore, it is possible to seal up the gap HB between the actuating pin 54B and the through hole 35a uniformly over the entire circumference around the actuating pin 54B.

Further, in the embodiment, the actuators A1, A2, and A3 used for adjusting inner pressure when the airbag 21 is inflated have been described as examples. However, applications of the actuators in the present invention are not limited thereto. For example, in an airbag apparatus of a type in which a shape of a completely inflated airbag is controlled, the actuators in the present invention may be used for pulling a regulatory member such as a tether that regulates a shape of a completely inflated airbag.

What is claimed is:

1. An actuator with an actuating pin comprising:
a piston having an actuating pin;
a squib which is ignited during actuation to be capable of generating a driving gas; and
a cylinder case holding the piston, wherein
the piston is configured to make the actuating pin protrude from a leading end thereof,
the cylinder case has a substantially tubular peripheral wall part that covers a circumference of the piston, and a ceiling wall part which has a through hole which allows the actuating pin to protrude therethrough, the ceiling wall part blocks up a leading end side of the peripheral wall part,
during actuation of the actuator with the actuating pin, the driving gas generated from the squib is ejected to a space between the ceiling wall part and the piston in the cylinder case, to make the piston move backward along with the actuating pin,
a sealing ring which is relatively movable with respect to the actuating pin while maintaining a state of sealing up a gap between the actuating pin and the through hole, is provided at an inner face side of the ceiling wall part, and
a presser plate which is formed to have stiffness higher than that of the sealing ring, the presser plate is relatively movable with respect to the actuating pin, and is capable of regulating a backward movement of the sealing ring when the piston moves backward, is provided at a rear side of the sealing ring.

2. The actuator with the actuating pin according to claim 1, wherein the squib is formed separately from the piston, the squib is held at a side of the cylinder case so as to be capable of ejecting the driving gas to the space between the ceiling wall part and the piston in the cylinder case.

3. The actuator with the actuating pin according to claim 1, wherein the sealing ring is composed of an O-ring.

4. The actuator with the actuating pin according to claim 1, wherein the sealing ring is formed into a flat-plate discoid shape having a fitting, hole into which the actuating pin can be inserted to fit.

5. The actuator with the actuating pin according to claim 1, wherein a sealing ring capable of ensuring airtightness between the piston and the peripheral wall part in the cylinder case, is provided at a base side distant from the actuating pin in the piston.

6. The actuator with the actuating pin according to claim 1, wherein the squib is provided integrally with the piston, the squib is configured to be capable of ejecting the driving gas to the space between the ceiling wall part and the piston in the cylinder case.

7. The actuator with the actuating pin according to claim 6, wherein at least some part of the piston and the peripheral wall part in the cylinder case are formed such that their cross-sectional shapes along the axial rotation direction are substantially noncircular, so as to make a rotation along the axial rotation direction of the piston with respect to the peripheral wall part impossible.

8. The actuator with the actuating pin according to claim 6, wherein
the piston is configured to cover a leading end side of the squib and make the actuating pin protrude therefrom, and to provide ejection holes from which the driving gas can be ejected, around the actuating pin, and
the ejection holes are provided to be capable of pressing the presser plate disposed at a rear side of the sealing ring in a direction of forward movement by the driving gas ejected from the ejection holes.

9. The actuator with the actuating pin according to claim 8, wherein the ejection holes are disposed so as to face the presser plate at the rear of the presser plate, and are configured to be capable of ejecting the driving gas along an axial direction of the actuating pin.

10. The actuator with the actuating pin according to claim 9, wherein a temporary joint member that allows a backward movement of the piston during actuation, and regulates a backward movement of the piston before actuation, is provided between the peripheral wall part and the piston in the cylinder case.

11. The actuator with the actuating pin according to claim 10, wherein a forward movement of the piston before actuation is regulated by the presser plate supported by the ceiling wall part via the sealing ring.

12. The actuator with the actuating pin according to claim 10, wherein a tubular member which is formed by performing bending work on a sheet metal material, that makes the piston slidable on an inner circumferential surface thereof, is provided in a state in which a movement thereof along the axial direction with respect to the cylinder case is restricted, between the peripheral wall part and the piston in the cylinder case, and
the tubular member is formed as the temporary joint member on which locking protrusions which are formed to be cut to stand so as to protrude toward the inner circumferential surface, and are configured to lock a rim of a locking recessed portion provided on the piston in assembly with an outer circumference of the piston, to be capable of regulating a backward movement of the piston before actuation, and of unlocking the locking so as to allow a backward movement of the piston during actuation, are provided.

13. The actuator with the actuating pin according to claim 12, wherein
the tubular member is formed of a plate spring material, and is composed of a peripheral wall having the locking protrusions, which is a substantially cylinder shape whose both end sides in the axial direction are open, and
the peripheral wall is formed so as to be divided axially over an entire area by one slit formed along the axial direction, and is configured such that an inner diameter size except for the regions of the locking protrusions in an initial state before diameter expansion, is set to a size with which the peripheral wall can be tightly pressured onto the outer circumferential surface of the piston.

14. The actuator with the actuating pin according to claim 12, wherein the tubular member has a top plate serving as the presser plate disposed at the side of the ceiling wall part of the cylinder case so as to cover one end side in the axial direction, and a peripheral wall having the locking protrusions, which is provided between the peripheral wall part and the piston in the cylinder case.

15. The actuator with the actuating pin according to claim 14, wherein deforming parts which are deformable are provided so as to enable the top plate to relatively move forward with respect to the peripheral wall during actuation, near a rim of the top plate in the vicinities of the joining parts with the peripheral wall.

16. The actuator with the actuating pin according to claim 14, wherein
the tubular member is formed of a plate spring material,
the peripheral wall is composed of curved plate parts which are formed to divide an area at a side of an inner circumference of the peripheral wall part in the cylinder case into a plurality of pieces along the axial rotation direction, and are respectively jointed to the top plate, and
the respective curved plate parts are formed such that an inner diameter size except for regions of the locking protrusions in an initial state before diameter expansion, is set to a size with which the curved plate parts can be tightly pressured onto an outer circumferential surface of the piston.

* * * * *